United States Patent
Kabra et al.

(10) Patent No.: US 11,550,813 B2
(45) Date of Patent: Jan. 10, 2023

(54) STANDARDIZATION IN THE CONTEXT OF DATA INTEGRATION

(71) Applicant: International Business Machines Corporation, Armonk, NY (US)

(72) Inventors: Namit Kabra, Hyderabad (IN); Krishna Kishore Bonagiri, Ambajipet (IN); Mike W. Grasselt, Leinfelden-Echterdingen (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/183,915

(22) Filed: Feb. 24, 2021

(65) Prior Publication Data

US 2022/0277017 A1 Sep. 1, 2022

(51) Int. Cl.
  *G06F 16/25* (2019.01)
  *G06K 9/62* (2022.01)
  (Continued)

(52) U.S. Cl.
  CPC .......... *G06F 16/258* (2019.01); *G06F 16/213* (2019.01); *G06F 16/256* (2019.01); *G06F 16/951* (2019.01); *G06K 9/6256* (2013.01)

(58) Field of Classification Search
  CPC .... G06F 16/258; G06F 16/213; G06F 16/256; G06F 16/951; G06K 9/6256; G06N 20/00
  See application file for complete search history.

(56) References Cited

U.S. PATENT DOCUMENTS 9,104,709 B2   8/2015 Chaturvedi et al.
10,878,505 B1 * 12/2020 Blair ................. G06F 40/20
(Continued)

FOREIGN PATENT DOCUMENTS

CN   109815480 A   5/2019
CN   111858570 A   10/2020
CN   112328585 A   2/2021

OTHER PUBLICATIONS

Woodall, Philip et al. A Classification of Data Quality Assessment and Improvement Methods, International Journal of Information Quality, Sep. 2014, 3(4):298. [23 printed pages] <https://www.researchgate.net/publication/266030806>.
(Continued)

*Primary Examiner* — Dangelino N Gortayo
(74) *Attorney, Agent, or Firm* — The Steadman Law Firm PLLC

(57) ABSTRACT

Techniques are described relating to automatic data standardization in a managed services domain of a cloud computing environment. An associated computer-implemented method includes receiving a dataset during a data onboarding procedure and classifying datapoints within the dataset. The method further includes applying a machine learning data standardization model to each classified datapoint within the dataset and deriving a proposed set of data standardization rules for the dataset based upon any standardization modification determined consequent to model application. Optionally, the method includes presenting the proposed set of data standardization rules for client review and, responsive to acceptance of the proposed set of data standardization rules, applying the proposed set of data standardization rules to the dataset. The method further includes, responsive to acceptance of the proposed set of
(Continued)

data standardization rules, updating the machine learning data standardization model accordingly.

20 Claims, 11 Drawing Sheets

(51) Int. Cl.
    *G06F 16/951*     (2019.01)
    *G06F 16/21*     (2019.01)

(56) References Cited

U.S. PATENT DOCUMENTS

| | | | |
|---|---|---|---|
| 2011/0138312 A1 | 6/2011 | Yeh et al. | |
| 2018/0060334 A1* | 3/2018 | Jensen | G06F 16/3344 |
| 2019/0095801 A1 | 3/2019 | Saillet et al. | |
| 2019/0114360 A1* | 4/2019 | Garg | G06F 40/14 |
| 2019/0179888 A1 | 6/2019 | Saillet et al. | |
| 2020/0050949 A1* | 2/2020 | Sundararaman | G06F 40/284 |
| 2020/0151201 A1* | 5/2020 | Chandrasekhar | G06N 5/022 |
| 2020/0279219 A1* | 9/2020 | Desai | G06Q 10/0835 |
| 2021/0109915 A1* | 4/2021 | Godden | G06F 9/54 |
| 2021/0174218 A1* | 6/2021 | Miller | G06Q 10/103 |
| 2021/0406601 A1* | 12/2021 | Narlikar | G06V 10/7784 |

OTHER PUBLICATIONS

Tutorial: Enhancing an address rule set in the Standardization Rules Designer. IBM Knowledge Center Support, Dec. 14, 2012. [6 printed pages] <https://www.ibm.com/support/knowledgecenter/SSZJPZ_9.1.0/%20com.ibm.swg.im.iis.qs.srdaddtut.doc/topics/address_scenariointro.html>.

Data Quality Management: Roles, Processes, Tools. AltexSoft, Oct. 17, 2019. [15 printed pages] <https://www.altexsoft.com/blog/data-quality-management-and-tools/>.

Cleanse Data Using DQS (Internal) Knowledge. Microsoft Docs—Data Quality Services, Mar. 1, 2017. [12 pages] <https://docs.microsoft.com/en-us/sql/data-quality-services/cleanse-data-using-dqs-internal-knowledge?view=sql-server-ver15>.

Kabra, Namit. OLTP vs OLAP. Namit's Blog, May 31, 2012. [2 printed pages] <https://namitkabra.wordpress.com/2012/05/31/oltp-vs-olap-10/>.

Saillei, Yannick. Data Classification explained. Towards Data Science, Nov. 27, 2020. [13 printed pages] <https://towardsdatascience.com/data-classification-explained-db4567cf0fbf>.

Data quality dimensions evaluated. IBM Knowledge Center, Accessed Dec. 18, 2020. [5 printed pages] <https://www.ibm.com/support/knowledgecenter/SSZJPZ_11.5.0/com.ibm.swg.im.iis.ia.product.doc/topics/r_quality_indicators.html#r_quality_suspect>.

Master Data Management. IBM Cloud, Jan. 21, 2021. [1 printed page] <https://cloud.ibm.com/catalog/services/master-data-management#about>.

Mell, Peter et al. The NIST Definition of Cloud Computing. National Institute of Standards and Technology, U.S. Department of Commerce, NIST Special Publication 800-145, Sep. 2011, 7 pages.

Patent Cooperation Treaty International Searching Authority. Patent Cooperation Treaty International Search Report, May 19, 2022. [9 printed pages].

Zhang, Jie et al. Study on Standardization of Detection Data of Atmospheric Microparticle Lidar Based on Metadata. IEEE 2018 14th International Conference on Computational Intelligence and Security (CIS), Nov. 16, 2018, pp. 481-484.

\* cited by examiner

STANDARDIZATION IN THE CONTEXT OF DATA INTEGRATION

BACKGROUND

The various embodiments described herein generally relate to standardization in the context of data integration. More specifically, the various embodiments describe techniques of creating a set of data standardization rules to facilitate data integration in a managed services domain of a cloud computing environment.

SUMMARY

The various embodiments described herein provide techniques of automatic data standardization in a data integration context. An associated computer-implemented method includes receiving a dataset during a data onboarding procedure. The method further includes classifying datapoints within the dataset. The method further includes applying a machine learning data standardization model to each classified datapoint within the dataset. The method further includes deriving a proposed set of data standardization rules for the dataset based upon any standardization modification determined consequent to application of the machine learning data standardization model. In an embodiment, optionally the method includes presenting the proposed set of data standardization rules for client review and, responsive to acceptance of the proposed set of data standardization rules, applying the proposed set of data standardization rules to the dataset. In a further embodiment, the method includes, responsive to acceptance of the proposed set of data standardization rules, updating the machine learning data standardization model based upon the proposed set of data standardization rules.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
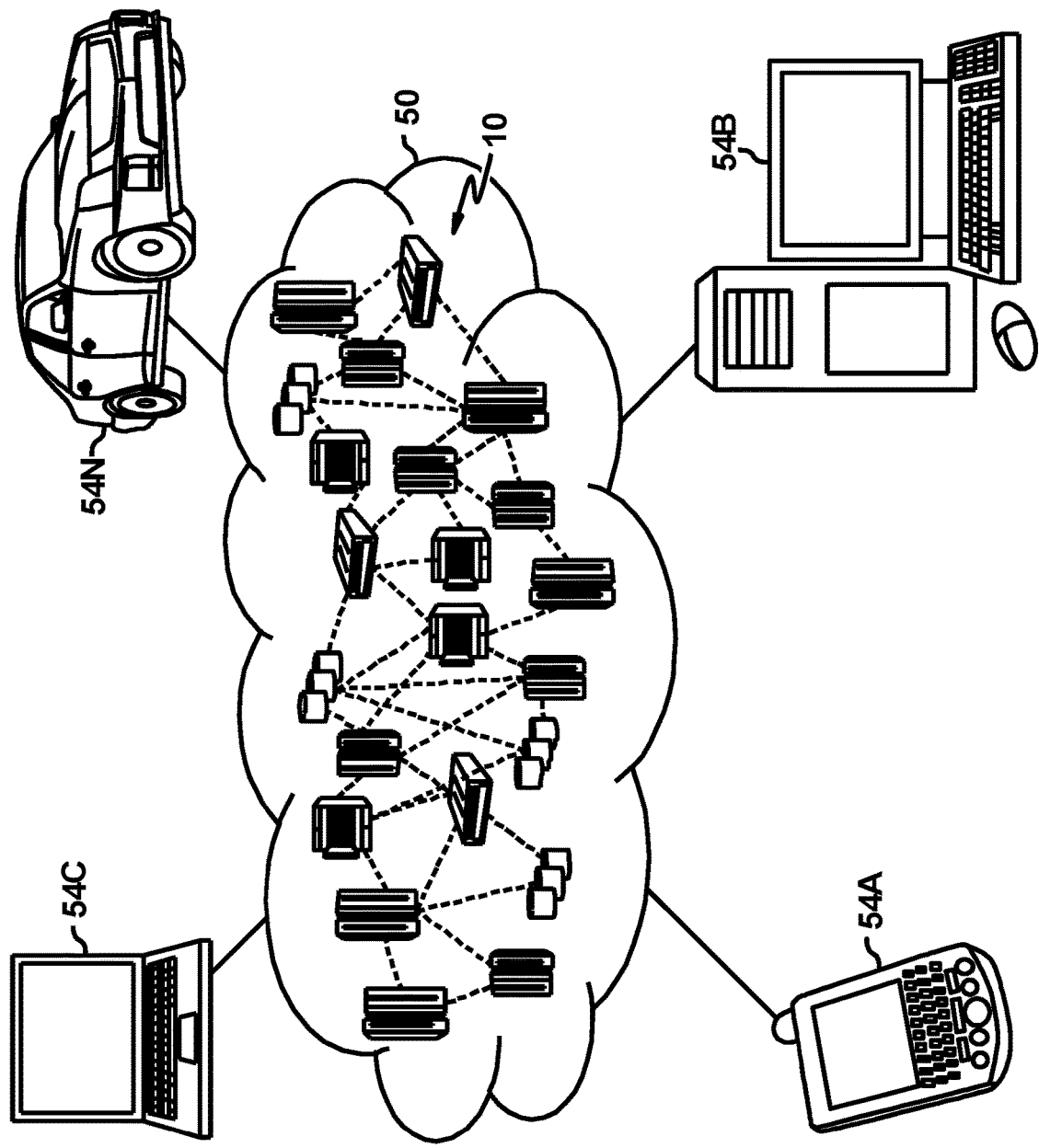
FIG. 1 depicts a cloud computing environment, according to one or more embodiments.

The various embodiments described herein are directed to techniques of automatic data standardization for purposes of data integration in a managed services domain of a cloud computing environment. In the context of the various embodiments, data integration encompasses data governance and further encompasses data governance and integration. An example data integration solution is the IBM® Unified Governance and Integration Platform. A cloud computing environment is a virtualized environment in which one or more computing capabilities are available as a service. A cloud server system configured to implement automatic data standardization techniques associated with the various embodiments described herein may utilize artificial intelligence capabilities of a machine learning knowledge model, specifically a machine learning data standardization model, as well as information of a knowledge base associated with such model.

The various embodiments may have advantages over conventional techniques. Conventional data integration entails data onboarding that requires manual standardization, e.g., manual remediation of anomalous or otherwise nonconforming datapoints within a dataset by a subject matter expert or data steward. Manual remediation, while useful in improving data quality, may consume significant resources in terms of time and labor. The various embodiments described herein focus upon providing automatic standardization in the context of data integration, thus reducing necessity for manual remediation. Specifically, the various embodiments facilitate automatic data standardization of a dataset by reducing the need for manual data standardization by a subject matter expert and/or data steward, while still permitting review and approval when desired. Furthermore, the various embodiments improve computer technology by facilitating machine learning that increasingly improves data integration based upon successive applications of a data standardization model. Additionally, the various embodiments improve computer technology through application of data crawling and/or crowdsourcing techniques to address and/or investigate outlier values of a dataset. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to automatic data standardization for purposes of data integration in a managed services domain. However, it is to be understood that the techniques described herein may be adapted to a variety of purposes in addition to those specifically described herein. Accordingly, references to specific embodiments are included to be illustrative and not limiting.

The various embodiments described herein may be provided to end users through a cloud computing infrastructure. It is to be understood that although this disclosure includes a detailed description on cloud computing, implementation of the teachings recited herein is not limited to a cloud computing environment. Rather, the various embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Thus, cloud computing allows a user to access virtual computing resources (e.g., storage, data, applications, and even complete virtualized computing systems) in the cloud, without regard for the underlying physical systems (or locations of those systems) used to provide the computing resources. This cloud model may include at least five characteristics, at least three service models, and at least four deployment models.

Characteristics are as follows:

On-demand self-service: A cloud consumer can unilaterally provision computing capabilities, such as server time and network storage, as needed automatically without requiring human interaction with the provider of the service.

Broad network access: Capabilities are available over a network and accessed through standard mechanisms that promote use by heterogeneous thin or thick client platforms (e.g., mobile phones, laptops, and personal digital assistants (PDAs)).

Resource pooling: The computing resources of the provider are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): The capability provided to the consumer is to use the applications of the provider running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 illustrates a cloud computing environment 50, according to one or more embodiments. As shown, cloud computing environment 50 may include one or more cloud computing nodes 10 with which local computing devices used by cloud consumers, e.g., personal digital assistant or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described hereinabove, or a combination thereof. Accordingly, cloud computing environment 50 may offer infrastructure, platforms, and/or software as services for which a cloud consumer need not maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
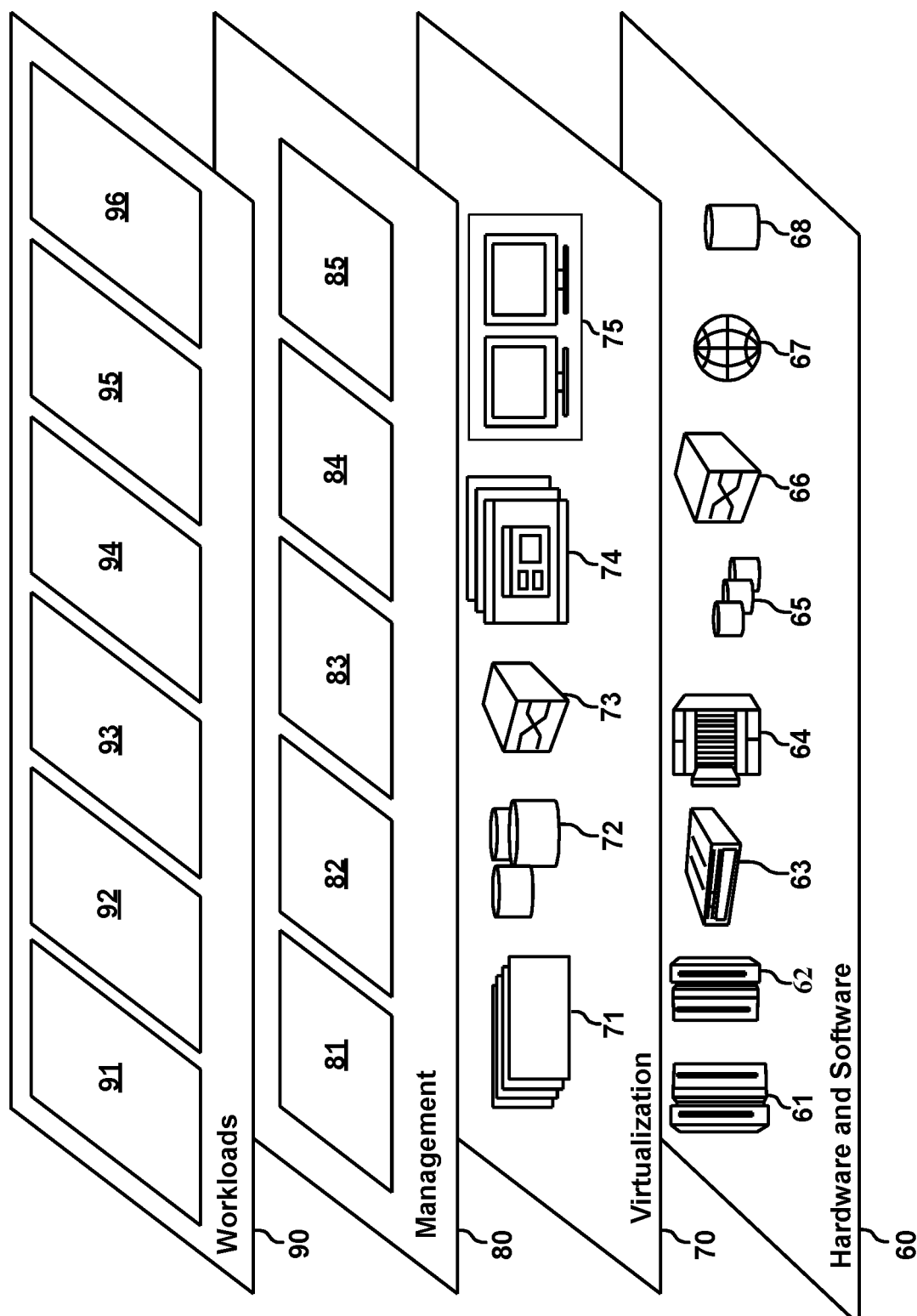
FIG. 2 depicts abstraction model layers provided by a cloud computing environment, according to one or more embodiments.

FIG. 2 illustrates a set of functional abstraction layers provided by cloud computing environment 50, according to one or more embodiments. It should be understood in advance that the components, layers, and functions shown in FIG. 2 are intended to be illustrative only; the various embodiments described herein are not limited thereto. As depicted, various layers and corresponding functions are provided. Specifically, hardware and software layer 60 includes hardware and software components. Examples of hardware components may include mainframes 61, RISC (Reduced Instruction Set Computer) architecture based servers 62, servers 63, blade servers 64, storage devices 65, and networks and networking components 66. In some embodiments, software components may include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 may provide dynamic procurement of computing resources and other resources that are utilized to perform tasks within cloud computing environment 50. Metering and pricing 82 may provide cost tracking as resources are utilized within cloud computing environment 50, and billing or invoicing for consumption of these resources. In one example, these resources may include application software licenses. Security provides identity verification for cloud consumers and tasks, as well as protection for data and other resources. User portal 83 may provide access to the cloud computing environment for consumers and system administrators. Service level management 84 may provide cloud computing resource allocation and management such that required service levels are met. Service Level Agreement (SLA) planning and fulfillment 85 may provide pre-arrangement for, and procurement of, cloud computing resources for which a future requirement is anticipated in accordance with a SLA.

Workloads layer 90 provides examples of functionality for which cloud computing environment 50 may be utilized. Examples of workloads and functions which may be provided from this layer include: mapping and navigation 91; software development and lifecycle management 92; virtual classroom education delivery 93; data analytics processing 94; transaction processing 95; and data standardization 96. Data standardization 96 may enable automatic data standardization for purposes of data integration via a machine learning knowledge model in accordance with the various embodiments described herein.

Figure 3:
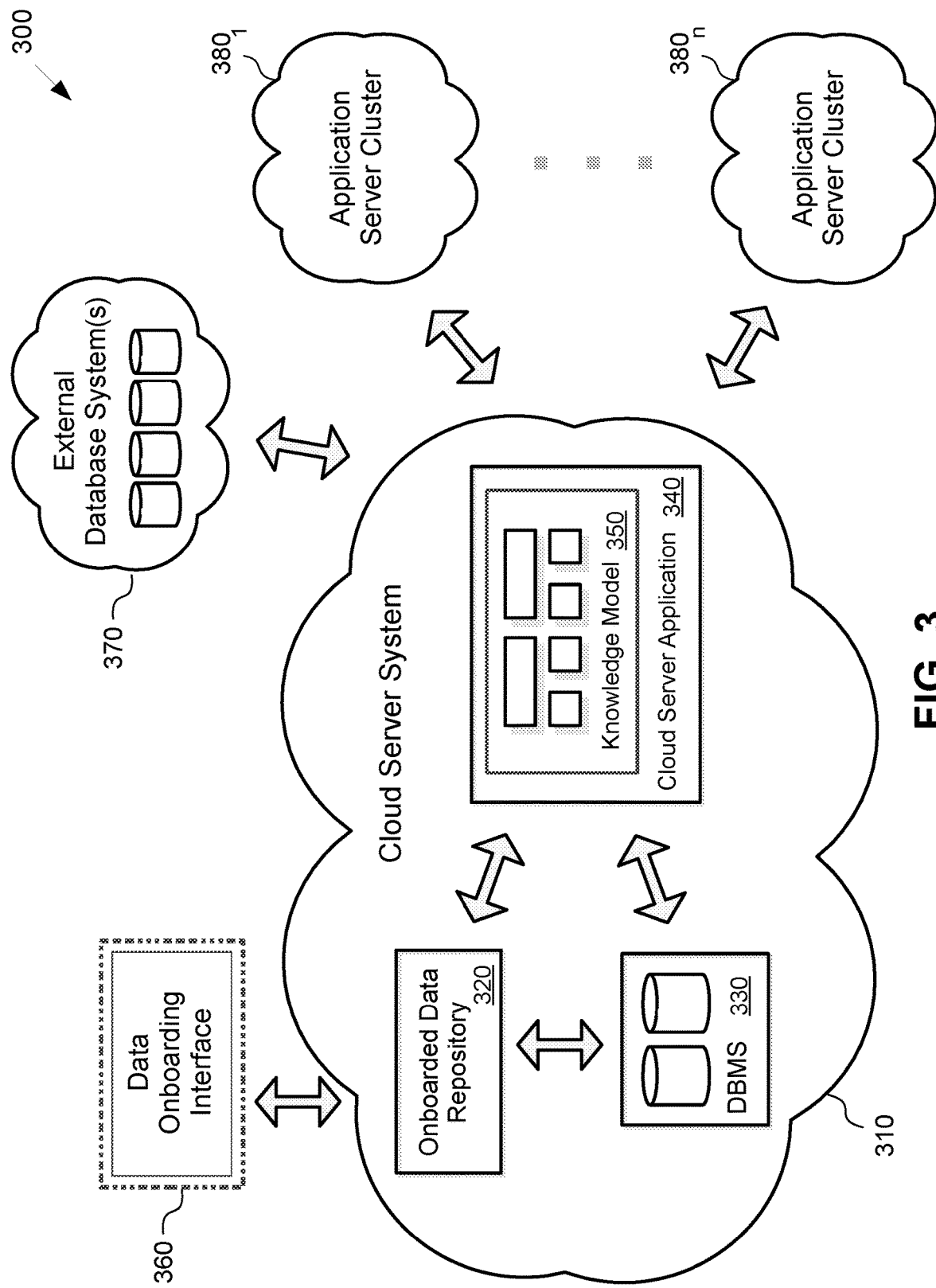
FIG. 3 depicts a managed services domain in a cloud computing environment, according to one or more embodiments.

FIG. 3 illustrates a managed services domain 300 within cloud computing environment 50. Functionality related to data standardization 96 and other workloads/functionality may be carried out in managed services domain 300. Managed services domain 300 includes cloud server system 310. In an embodiment, cloud server system 310 includes onboarded data repository 320, a database management system (DBMS) 330, and a cloud server application 340 including a machine learning knowledge model 350, which incorporates capabilities of at least a machine learning data standardization model. Cloud server application 340 is representative of a single application or multiple applications. Machine learning knowledge model 350 is configured to enable and/or facilitate automatic data standardization in accordance with the various embodiments described herein. Furthermore, managed services domain 300 includes a data onboarding interface 360, one or more external database systems 370, and a plurality of application server clusters $380_1$ to $380_n$. Data onboarding interface 360 enables communication between cloud server system 310 and data clients/systems that interact with managed services domain 300 to facilitate data onboarding in the context of data integration. In an embodiment, cloud server system 310 is configured to communicate with the one or more external database systems 370 and the plurality of application server clusters $380_1$ to $380_n$. Additionally, respective servers within application server clusters $380_1$ to $380_n$ may be configured to communicate with one another and/or with server clusters in other domains.

In an embodiment, onboarded data repository 320, representative of either a single data repository or a collection of data repositories, includes unstandardized and/or pre-standardized datasets received from data onboarding interface 360 during data onboarding procedure(s) as well as classified and standardized datasets processed in accordance with the various embodiments described herein. Alternatively, one or more data repositories include pre-standardized and/or unstandardized datasets received during data onboarding procedure(s), while one or more additional data repositories include classified and standardized datasets. According to a further alternative, one or more data repositories include pre-standardized and/or unstandardized datasets received during data onboarding procedure(s), one or more additional data repositories include classified datasets, and one or more further additional data repositories include standardized datasets. In an embodiment, DBMS 330 coordinates and manages a knowledge base of the machine learning knowledge model 350. DBMS 330 may include one or more database servers, which may coordinate and/or manage various aspects of the knowledge base. In an additional embodiment, DBMS 330 manages or otherwise interacts with the one or more external database systems 370. The one or more external database systems 370 include one or more relational databases and/or one or more database management systems configured to interface with DBMS 330. In a further embodiment, DBMS 330 stores relationships between the plurality of application server clusters $380_1$ to $380_n$ and the knowledge base. In a further embodiment, DBMS 330 includes or is operatively coupled to one or multiple databases, some or all of which may be relational databases. In a further embodiment, DBMS 330 includes one or more ontology trees or other ontological structures. Application server clusters $380_1$ to $380_n$ host and/or store aspects of various applications and also provide managed server services to one or more client systems and/or data systems.

Figure 4:
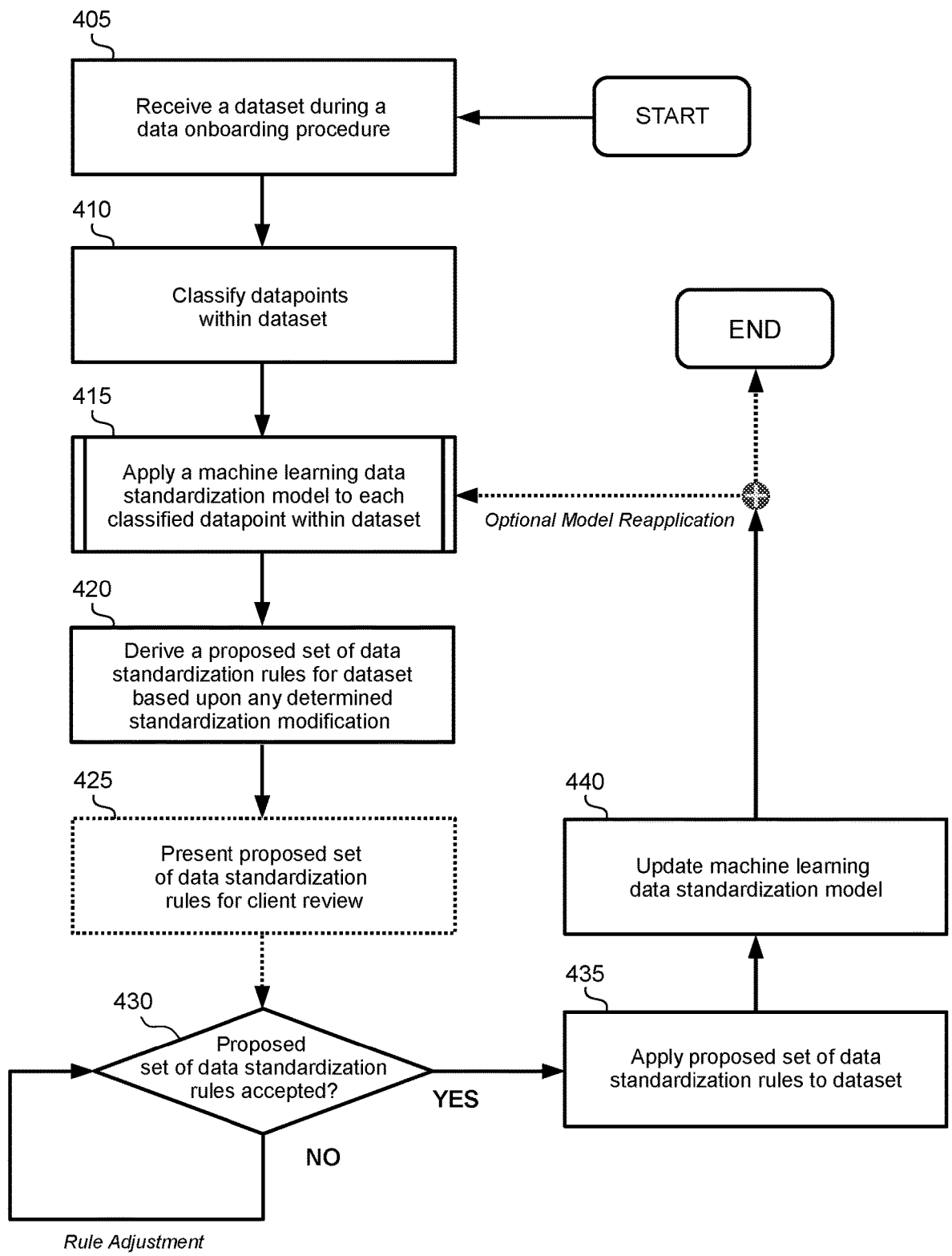
FIG. 4 illustrates a method of creating data standardization rules to facilitate data integration in a managed services domain, according to one or more embodiments.

FIG. 4 illustrates a method 400 of creating data standardization rules to facilitate data integration. Creation of data standardization rules in accordance with the method 400 facilitates automatic data standardization in the context of the various embodiments described herein. In an embodiment, one or more steps associated with the method 400 are carried out in an environment in which computing capabilities are provided as a service (e.g., cloud computing environment 50). According to such embodiment, one or more steps associated with the method 400 are carried out in a managed services domain within the environment (e.g., managed services domain 300). The environment may be a hybrid cloud environment. In a further embodiment, one or more steps associated with the method 400 are carried out in one or more other environments, such as a client-server network environment or a peer-to-peer network environment. A centralized cloud server system in a managed services domain (e.g., cloud server system 310 in managed services domain 300) may facilitate processing according to the method 400 and the other methods further described herein. More specifically, a cloud server application in the cloud server system (e.g., cloud server application 340) may execute or otherwise facilitate one or more steps of the method 400 and the other methods described herein. The automatic data standardization techniques facilitated or otherwise carried out via the cloud server system in the managed services domain may be associated with data standardization within a workloads layer among functional abstraction layers provided by the environment (e.g., data standardization 96 within workloads layer 90 of cloud computing infrastructure 50).

The method 400 begins at step 405, where the cloud server application receives a dataset during a data onboarding procedure. The cloud server application receives the dataset in accordance with step 405 via a data onboarding interface in the managed services domain (e.g., via data onboarding interface 360). The onboarded data is stored fully or partially in at least one onboarded data repository (e.g., onboarded data repository 320), which may be or is otherwise associated with a data lake. In the context of the various embodiments described herein, a data lake is a storage repository holding data from many sources in natural or raw format. Data in a data lake may be structured, semi-structured, or unstructured. In an embodiment, the data onboarding procedure includes onboarding the dataset into a data lake. According to such embodiment, the dataset optionally is onboarded in Hadoop distributed file system (HDFS) format. Alternatively, according to such embodiment, the dataset is onboarded as normalized data, e.g., via manual or automatic elimination of data redundancies. In a further embodiment, only metadata associated with data located in a data lake is onboarded during the data onboarding procedure rather than the data itself. According to such further embodiment, based upon execution of steps of the method 400, the cloud server application optionally creates a standardized version of the data located in the data lake based upon the onboarded metadata. Alternatively, according to such further embodiment, based upon execution of steps of the method 400, the cloud server application applies data standardization directly to the data located in the data lake based upon the onboarded metadata. In sum, in the context of the method 400, the cloud server application optionally onboards the dataset into a data lake or alternatively onboards metadata associated with the dataset already within a data lake. In a further embodiment, the data onboarding procedure includes onboarding the dataset from an online transaction processing (OLTP) system to an online analytical processing (OLAP) system.

At step 410, the cloud server application classifies datapoints within the dataset received at step 405. In an embodiment, the cloud server application classifies the datapoints by detecting a data class based upon application of at least one data classifier algorithm, and, responsive to detecting the data class, labelling (e.g., tagging) an associated data field with a term or classification (e.g., business-associated term or classification). Examples of respective data classes include municipality and postal code. According to such embodiment, the at least one data classifier algorithm incorporates a regular expression to identify data within a data field or based upon a data field name. Additionally or alternatively, the at least one data classifier algorithm incorporates lookup operation(s) to reference table(s) containing constituent data class values. Additionally or alternatively, the at least one data classifier algorithm includes custom logic written in a programming language, e.g., Java. In a further embodiment, the cloud server application classifies datapoints based upon evaluation of respective individual values. Additionally or alternatively, the cloud server application classifies datapoints based upon evaluation of multiple values within a data column, e.g., in the context of structured or semi-structured data. Additionally or alternatively, the cloud server application classifies datapoints based upon evaluation of multiple values within multiple related data columns. In a further embodiment, the cloud server application associates a confidence level value to datapoint classifications made via the at least one data classifier algorithm. According to such further embodiment, the cloud sever application prioritizes and/or labels based upon confidence level datapoint classifications made via the at least one data classifier. Optionally, a client such as a subject matter expert or a data steward (i.e., a data editor or data engineer) overrides one or more datapoint classifications made via the at least one data classifier algorithm and manually assigns datapoint classification(s).

In an embodiment, in the context of step 410, the cloud server application randomly samples a subset of classified datapoints within the dataset. According to such embodiment, the cloud server application determines the value of a random sampled datapoint and then determines a particular data class and/or data column associated with the randomly sampled datapoint. According to such embodiment, the cloud server application determines a data class and/or data column associated with other datapoints within the subset based upon association(s) with randomly sampled datapoints. Thus, random sampling according to such embodiment may enable the cloud server application to avoid iterating through the entire dataset in order to classify the datapoints. Additionally or alternatively, the cloud server application directly classifies one or more datapoints of the dataset by assigning a data class. Accordingly, the cloud server application may classify each datapoint within the dataset based upon random sampling and/or based upon direct manual classification.

At step 415, the cloud server application applies a machine learning data standardization model (e.g., machine learning knowledge model 350) to each classified datapoint within the dataset. In an embodiment, the cloud server application applies the data standardization model based upon data class. According to such embodiment, type(s) of anomalies detected and corresponding standardization with respect to such anomaly type(s) is determined at least in part based upon data class type. For instance, a datapoint having a phone number data class only requires validation with respect to format (i.e., only a format anomaly is relevant), whereas a datapoint having a municipality data class requires validation with respect to at least spelling and possibly syntax (i.e., spelling and syntax anomalies are potentially relevant). As further described herein, data class also is relevant with respect to distinguishing between string values and non-string values in the dataset.

In an embodiment, the cloud server application applies a plurality of data quality rules in the context of the data standardization model in order to determine whether a datapoint within the dataset is a valid value or an outlier value and further to determine how to address any value determined to be an outlier. The plurality of data quality rules include a plurality of baseline data integration rules, which are standardization baselines to determine whether a datapoint is a valid value or an outlier value. In the context of the various embodiments described herein, the plurality of baseline data integration rules are hardcoded or fixed rules applicable to a data class or a group of data classes and are integrated into the data standardization model upon model initialization. Optionally, the plurality of baseline data integration rules are customized based upon dataset size and/or dataset source. The plurality of baseline data integration rules include preestablished rules for identifying anomalies associated with datapoints within a dataset. In a further embodiment, the plurality of baseline data integration rules are specific to a particular data class or a particular group of data classes. According to such further embodiment, the cloud server application applies the plurality of baseline data integration rules based upon data class. For instance, per a baseline integration rule with respect to a birthdate data class value, such value cannot be a date in future. According to such further embodiment, the cloud server application optionally analyzes a null value or duplicate value based upon the data class associated with such null value or duplicate value. In the context of the various embodiments, a valid value is a value that conforms with the plurality of baseline data integration rules, whereas an outlier value is a value that does not conform with the plurality of baseline data integration rules. The cloud server application optionally determines that a value does not conform with the plurality of baseline data integration rules and thus is an outlier value if the value does not meet one or more conditions established for an associated data class and/or for an associated data column, i.e., if the value includes at least one anomaly. Additionally or alternatively, the cloud server application determines that a value does not conform with the plurality of baseline data integration rules and thus is an outlier value if such value is inconsistent with other values in a defined group within the dataset, e.g., a data column or a group of associated data columns. In certain instances, such inconsistency is evident in a scenario in which a first data column is correlated with another data column or other data columns, such that an outlier value within the first data column is inconsistent with a corresponding value in another data column or other data columns correlated to the first data column. In the context of the various embodiments, respective columns are correlated if a value within one column is predictable based upon value(s) in other column(s). In other instances, such inconsistency is evident in a scenario in which data values within a data column are interrelated based upon data column position, such that an outlier value within the data column is inconsistent with its data column position. In other instances such inconsistency is evident by an outlier value having inconsistencies both with respect to corresponding value(s) in correlated data column(s) and with respect to its data column position.

In addition to the plurality of baseline data integration rules, the plurality of data quality rules include any set of data standardization rules previously derived and accepted for purposes of addressing values determined to be outlier values consequent to application of the plurality of baseline data integration rules. The plurality of data quality rules are fully bound so as not to have any indefinite ranges. Furthermore, the plurality of data quality rules include variables that are bound to data columns in the dataset. In an embodiment, the cloud server application calculates a quantity of outlier values identified within the dataset consequent to application of the data standardization model. According to such embodiment, the cloud server application calculates a quantitative data quality score for the dataset based upon conformance to the plurality of baseline data integration rules. The cloud server application optionally calculates the data quality score based upon percentage of nonconforming/outlier values out of all of the classified datapoints within the dataset. By applying the data standardization model according to step 415, the cloud server application may apply the standardization rules previously derived and accepted in order to address outlier values, and furthermore as described below the cloud server application may determine additional standardization modifications based upon which a new set of proposed standardization rules may be derived. A method with regard to applying the data standardization model to each datapoint within the dataset according to step 415 is described with respect to FIG. 6.

At step 420, the cloud server application derives a proposed set of data standardization rules for the dataset based upon any standardization modification determined consequent to application of the machine learning data standardization model. The proposed set of data standardization rules includes one or more rules to facilitate dynamic dataset standardization automatically upon subsequent model application. In an embodiment, the proposed set of data standardization rules includes a plurality of mappings, which optionally are stored in a standardization lookup table. According to such embodiment, the plurality of mappings include a respective mapping or other relational aspect from an outlier value to a valid value. Specifically, the plurality of mappings may include a mapping between an outlier string value including a misspelling of one or more letters to a valid string value with a proper spelling, e.g., outlier string value "Dehli" may be mapped to valid string value "Delhi". Embodiments with respect to standardization modification determination are further described herein.

Optionally, at step 425 the cloud server application presents the proposed set of data standardization rules derived at step 420 for client review. In an embodiment, the cloud server application presents the proposed set of data standardization rules by publishing the set in a client-accessible forum. In a further embodiment, the cloud server application presents the proposed set of data standardization rules by transmitting the set to a client interface. According to such further embodiment, the client interface is a user interface in the form of a graphical user interface (GUI) and/or a command line interface (CLI) presented via at least one client application installed on or otherwise accessible to a client system or device. Optionally the cloud server application facilitates client acceptance of the proposed set of data standardization rules by generating a form response interface element for display to the client, e.g., in a client-accessible forum or a client interface. A client includes a subject matter expert for a particular domain, a data steward, and/or any other entity associated with the dataset or the cloud server system.

In an embodiment, the cloud server application automatically accepts the proposed set of data standardization rules without client review based upon a quantitative confidence level value attributed to the proposed set of data standardization rules and/or respective standardization rules therein. According to such embodiment, the cloud server application automatically accepts the proposed set of data standardization rules and thus forgoes client review responsive to determining that the proposed set of data standardization rules remediate data inaccuracies at a confidence level exceeding a predetermined confidence level threshold. The predetermined confidence level threshold quantitatively measures confidence in automatic data remediation ability, i.e., remediation ability without a subject matter expert/data steward. According to such embodiment, the quantitative confidence level value attributed to the proposed set of data standardization rules and/or respective standardization rules therein optionally is set by the client based on a relevant use case. Additionally or alternatively, the confidence level value is determined based upon data relationships identified via machine learning analysis in the context of previous model applications and/or previous model iterations (i.e., a previous iteration within a current model application). For example, assuming that a state capital data class value is "Memphis", the corresponding state data class value always would be "Tennessee", and thus the confidence level value with respect to one or more applicable data standardization rules would be relatively high. In another example, assuming that a state capital data class value is "Hyderabad", the corresponding state data class value could be either "Telangana" or "Andhra Pradesh" depending upon the context (since Hyderabad is the capital of both states), and thus the confidence level value with respect to one or more applicable data standardization rules would be relatively low. Accordingly, assuming that the predetermined confidence level threshold in the context of these examples is the same, it is relatively more likely that the cloud server application accepts the proposed set of data standardization rules without client review in the context of determining standardized state data class values if one or more rules within the proposed set address state data class value(s) within the dataset corresponding to "Memphis" as opposed to "Hyderabad".

At step 430, the cloud server application determines whether the proposed set of data standardization rules have been accepted. Acceptance of the proposed set of data standardization rules optionally is determined based upon client review, or alternatively acceptance is automatic responsive to determining that the proposed set of data standardization rules remediate data inaccuracies at a confidence level exceeding the predetermined confidence level threshold. Responsive to determining that the proposed set of data standardization rules have not been accepted, the cloud server application optionally adjusts one or more of the proposed set of data standardization rules and then repeats step 430. Optionally, such rule adjustment includes collection of client feedback with regard to the proposed set of data standardization rules, in which case the cloud server application may apply one or more modifications based upon the client feedback. In an embodiment, such client feedback includes one or more rule override requests having one or more client-imposed rule modifications. The cloud server application optionally adjusts the proposed set of data standardization rules based upon the client feedback.

Responsive to determining that the proposed set of data standardization rules have been accepted, at step 435 the cloud server application applies the proposed set of data standardization rules to the dataset. In an embodiment, the cloud server application applies the proposed set of data standardization rules to each datapoint of the dataset. In a further embodiment, the cloud server application confirms that dataset data quality has improved consequent to application of the proposed set of data standardization rules. According to such further embodiment, the cloud server application confirms that dataset data quality has improved through client review of data quality for the dataset before and after application of the proposed set of data standardization rules. Additionally or alternatively, the cloud server application confirms that dataset data quality has improved via comparison of dataset data quality before and after application of the proposed set of data standardization rules.

Furthermore, responsive to acceptance of the proposed set of data standardization rules, at step 440 the cloud server application updates the machine learning data standardization model based upon the proposed set of data standardization rules. In an embodiment, the cloud server application integrates (e.g., adds or otherwise associates) the proposed set of data standardization rules to the plurality of data quality rules associated with the data standardization model, such that the cloud server application considers the proposed set of data standardization rules along with the plurality of baseline data integration rules and any previously accepted sets of data standardization rules during subsequent model application. According to such embodiment, the cloud server application adds the proposed set of data standardization rules to a knowledge base associated with the data standardization model. The knowledge base associated with the model optionally includes all repositories, ontologies, files, and/or documentation associated with the plurality of data quality rules as well as any proposed data standardization rule sets. The cloud server application optionally accesses the knowledge base via a DBMS associated with the cloud server system (e.g., DBMS 330).

Based upon integration of the proposed set of data standardization rules into the plurality of data quality rules, the cloud server application optionally trains the data standardization model to identify datapoint patterns which will permit automatic standardization during subsequent model application. The cloud server application facilitates adaptation of the proposed set of data standardization rules upon acceptance to ensure that outlier values previously unexpected but addressed by the proposed set automatically are standardized upon subsequent application of the plurality of data quality rules associated with the machine learning data standardization model. Accordingly, based upon integration of the proposed set of data standardization rules, during subsequent model application the cloud server application automatically standardizes a dataset datapoint determined to be an outlier value if standardization of such datapoint is addressed by one or more of the proposed set of data standardization rules. Upon updating the data standardization model in accordance with step 440, the cloud server application optionally returns to step 415 to reapply the data standardization model to the dataset in order to refine dataset standardization. Such further embodiment is consistent with multi-pass algorithm application as contemplated in the context of the various embodiments. Alternatively, upon updating the data standardization model in accordance with step 440, the cloud server application may proceed to the end of the method 400.

Figure 5:
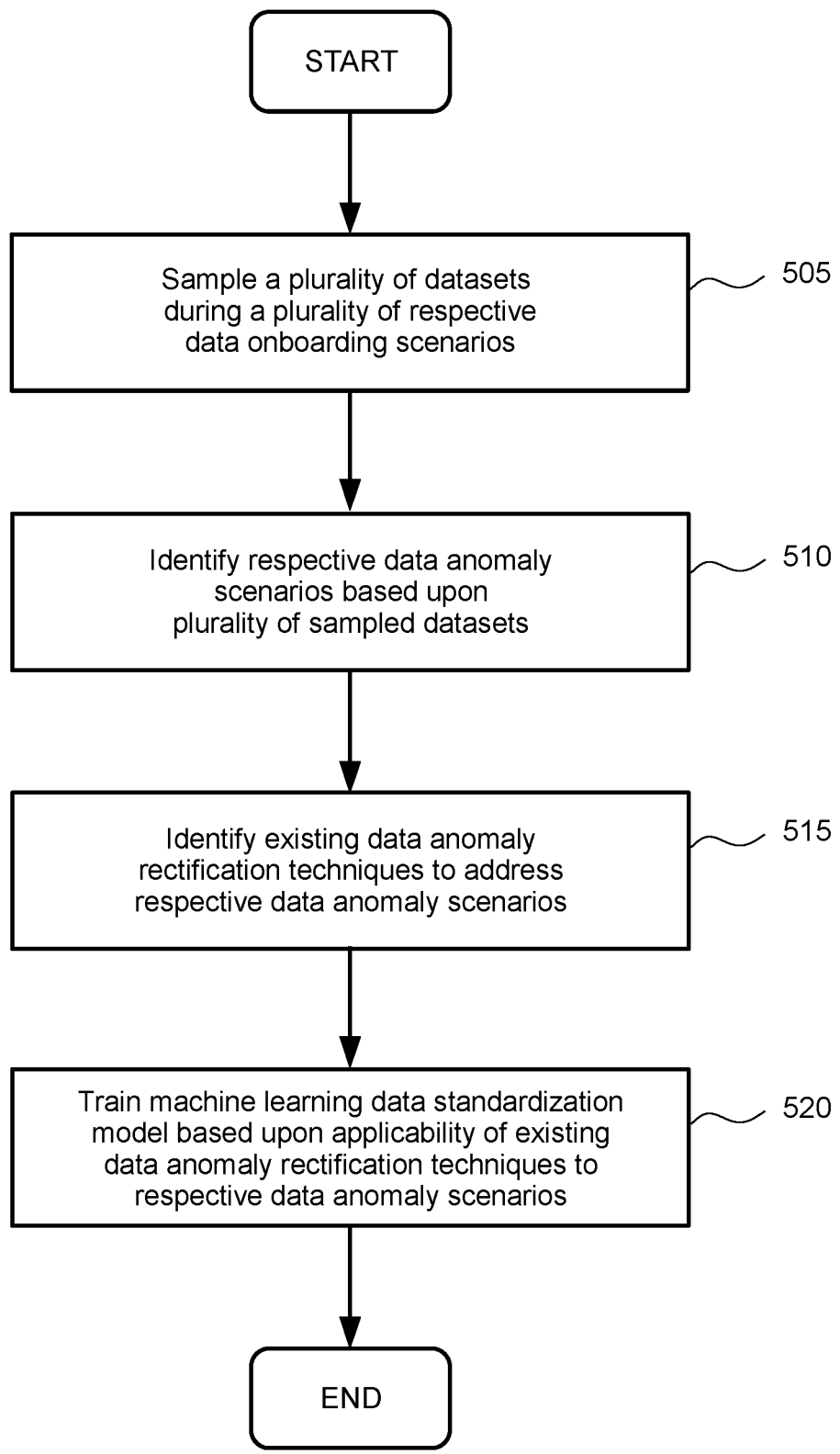
FIG. 5 illustrates a method of configuring a machine learning data standardization model, according to one or more embodiments.

FIG. 5 illustrates a method 500 of configuring the machine learning data standardization model. The method 500 begins at step 505, where the cloud server application samples a plurality of datasets during a plurality of respective data onboarding scenarios. In an embodiment, the cloud server application samples datasets based upon one or more associated data classes. According to one alternative, to focus upon a certain data class or certain data classes, the cloud server application samples datasets having greater than a threshold quantity of values classified according to the one or more associated data classes. According to another alternative, to ensure sampled data variety, the cloud server application samples datasets having values associated with greater than a threshold quantity of data classes. At step 510, the cloud server application identifies respective data anomaly scenarios based upon the plurality of sampled datasets. In an embodiment, the cloud server application identifies outlier values among the plurality of sampled datasets by applying the plurality of data quality rules associated with the data standardization model. Optionally, the plurality of baseline data integration rules within the plurality of data quality rules include at least one correlation rule identifying an expected relationship between or among respective values in correlated data columns. For instance, a correlation rule may require a numerical value of a certain row in a first data column to be double the numerical value of the certain row in a second data column. Additionally or alternatively, the plurality of baseline data integration rules include at least one data column interrelation rule identifying an expected relationship between or among interrelated values within a data column. Optionally, the plurality of data quality rules further include any adaptable rules derived from external sources such as ontologies or repositories. For example, the cloud server application may obtain a list of valid values from a data repository with respect to one or more data classes and derive rules to account for the valid values included in the list. Subsequent to initial construction of the data standardization model, the cloud server application optionally updates the plurality of data quality rules beyond the plurality of baseline data integration rules based upon acceptance of respective proposed sets of data standardization rules, e.g., in the context of the method 400, and/or based upon adoption of additional rules from external sources.

At step 515, the cloud server application identifies existing data anomaly rectification techniques to address the respective data anomaly scenarios. In an embodiment, the cloud server application identifies existing data anomaly rectification techniques by consulting any previously accepted data standardization rule sets and/or any previously proposed data standardization rule sets. Such rule sets may be stored in the knowledge base associated with the data standardization model or otherwise may be documented in relation to the model, e.g., such as to be retrievable from external sources. According to such embodiment, the cloud server application identifies any set of data standardization rules previously accepted and/or previously proposed for datasets among the plurality of sampled datasets. At step 520, the cloud server application trains the machine learning data standardization model based upon applicability of the existing data anomaly rectification techniques to the respective data anomaly scenarios. According to step 520, the cloud server application trains the model by creating and analyzing associative data addressing associations between the respective data anomaly scenarios and the existing data anomaly rectification techniques. The associative data may include confidence level data as to effectiveness of one or more of the existing anomaly rectification techniques in terms of addressing one or more of the respective data anomaly scenarios. Additionally or alternatively, the associative data may include comparisons of multiple existing anomaly rectification techniques in terms of addressing a certain respective data anomaly scenario. By analyzing the associative data, the cloud server application may determine which of the existing anomaly rectification technique(s) may be relatively more effective in terms of addressing the respective data anomaly scenarios or scenarios similar thereto during future model applications. Accordingly, the cloud server application may calibrate the model based upon such analysis. In an embodiment, the cloud server application records the associative data with respect to the model, e.g., in the knowledge base associated with the model.

In an embodiment, the cloud server application trains the data standardization model based upon analysis of any consulted previously accepted data standardization rule sets and/or any consulted previously proposed data standardization rule sets in order to enhance or otherwise adapt the plurality of data quality rules beyond the plurality of baseline data integration rules. Optionally the cloud server application integrates rules from previously accepted data standardization rule sets into the plurality of data quality rules consequent to training at step 520. Such training may enhance the data standardization model in addition to or as an alternative to updating the data standardization model consequent to acceptance of a proposed set of data standardization rules according to step 440 in the context of the method 400. In an additional embodiment, the cloud server application executes one or more of the model configuration steps, particularly external source consultation, initially in order to construct the data standardization model. In a further embodiment, the cloud server application executes one or more of the model configuration steps, particularly training, at periodic time intervals and/or each time the cloud server application processes a threshold quantity of datasets. The cloud server application may proceed to the end of the method 500 subsequent to training the machine learning data standardization model.

In sum, configuring the machine learning data standardization model according to the method 500 includes sampling a plurality of datasets during a plurality of respective data onboarding scenarios, identifying respective data anomaly scenarios based upon the plurality of sampled datasets, identifying existing data anomaly rectification techniques to address the respective data anomaly scenarios, and training the machine learning data standardization model based upon applicability of the existing data anomaly rectification techniques to the respective data anomaly scenarios.

Figure 6:
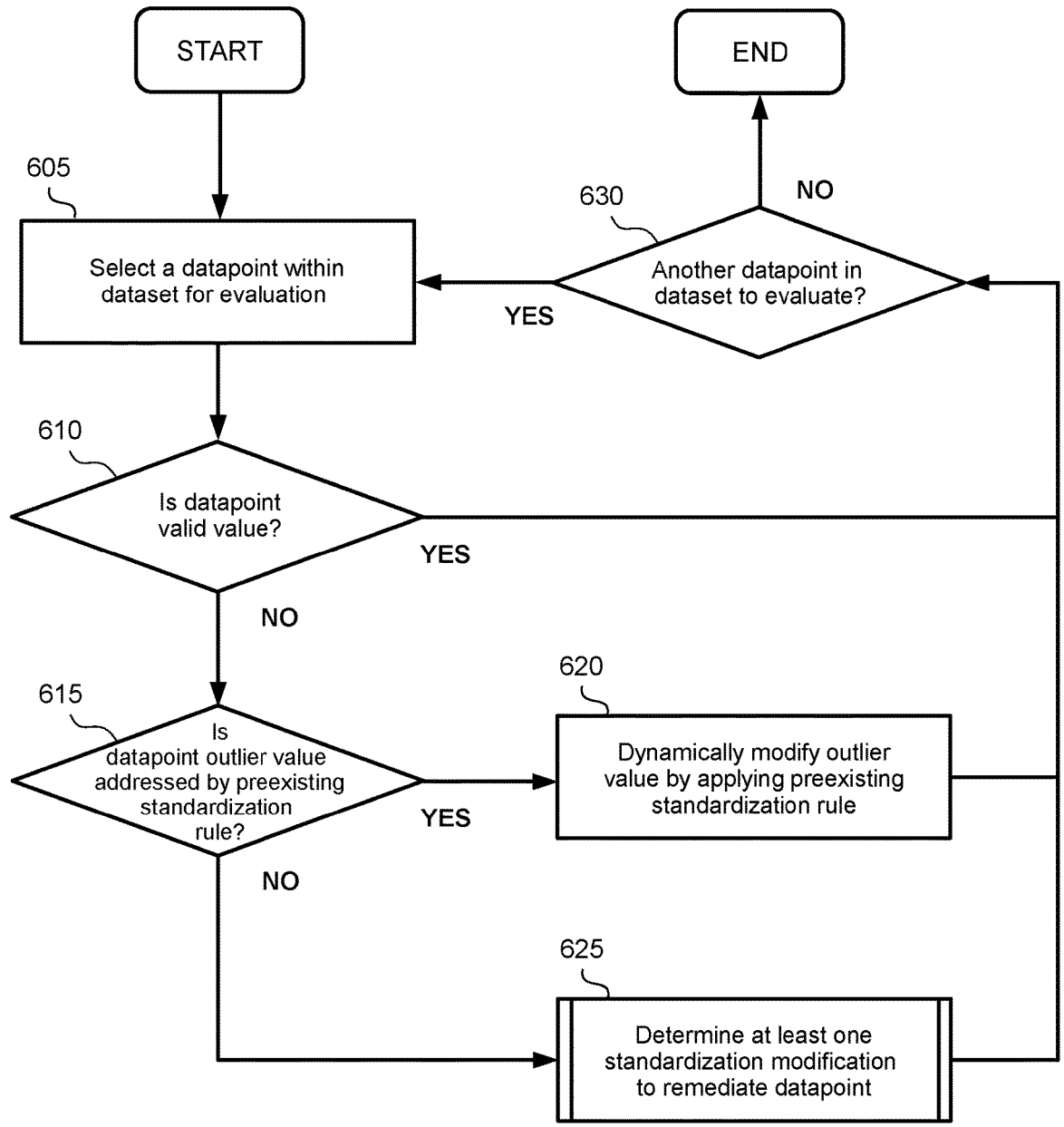
FIG. 6 illustrates a method of applying a machine learning data standardization model to each datapoint within a dataset, according to one or more embodiments.

FIG. 6 illustrates a method 600 of applying the machine learning data standardization model to each classified datapoint within the dataset, in the context of step 415 of the method 400. The method 600 begins at step 605, where the cloud server application selects a datapoint within the dataset for evaluation. At step 610, the cloud server application determines whether the datapoint selected at step 605 is a valid value. In an embodiment, the cloud server application determines whether the datapoint is a valid value by determining whether the datapoint conforms to the plurality of baseline data integration rules. Responsive to determining that the datapoint selected at step 605 is a valid value, no further standardization processing is necessary for the datapoint, and thus the cloud server application proceeds to step 630. Responsive to determining that the datapoint is not a valid value, i.e., responsive to determining that the datapoint does not conform to the plurality of baseline data integration rules, at step 615 the cloud server application determines whether the datapoint is an outlier value that is addressed by a preexisting standardization rule incorporated into the data standardization model, e.g., a rule from a previously accepted set of data standardization rules integrated into the plurality of data quality rules and/or a rule adapted from an external source consequent to model training. Responsive to determining that the datapoint is an outlier value that is addressed by a preexisting standardization rule incorporated into the data standardization model, at step 620 the cloud server application dynamically modifies the outlier value by applying the preexisting standardization rule. By dynamically modifying an outlier value based upon application of a preexisting standardization rule, the cloud server application may utilize the model to automatically resolve a standardization issue without further analysis and processing. Following step 620, the cloud server application proceeds to step 630.

Responsive to determining that the datapoint is an outlier value that is unaddressed by a preexisting standardization rule incorporated into the data standardization model, at step 625 the cloud server application determines at least one standardization modification to remediate the datapoint. A method with regard to determining at least one standardization modification to remediate the datapoint according to step 625 is described with respect to FIG. 7. Following step 625 the cloud server application proceeds to step 630. At step 630, the cloud server application determines whether there is another datapoint in the dataset to evaluate. Responsive to determining that there is another datapoint in the dataset to evaluate, the cloud server application returns to step 605. Responsive to determining that there is no other datapoint in the dataset to evaluate, the cloud server application may proceed to the end of the method 600.

In sum, applying the machine learning data standardization model to each classified datapoint within the dataset according to the method 600 includes, responsive to determining that the datapoint is an outlier value addressed by a preexisting standardization rule incorporated into the machine learning data standardization model, dynamically modifying the outlier value by applying the preexisting standardization rule. Furthermore, applying the machine learning data standardization model to each classified datapoint within the dataset according to the method 600 includes, responsive to determining that the datapoint is an outlier value unaddressed by any preexisting standardization rule, determining at least one standardization modification to remediate the datapoint.

Figure 7:
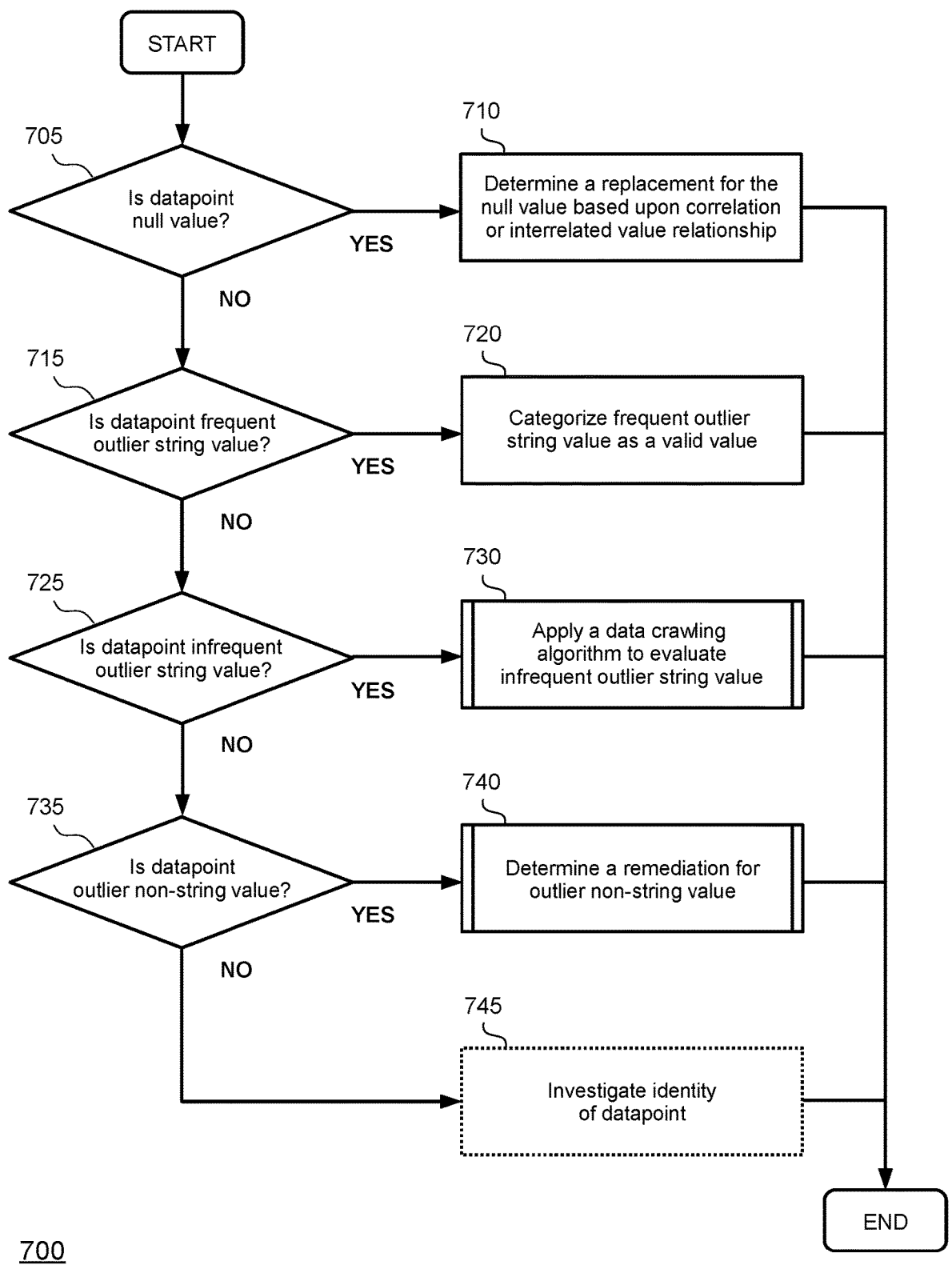
FIG. 7 illustrates a method of determining at least one standardization modification to address a datapoint within a dataset, according to one or more embodiments.

FIG. 7 illustrates a method 700 of determining at least one standardization modification to remediate the datapoint within the dataset, in the context of step 625 of the method 600. The method 700 begins at step 705, where the cloud server application determines whether the datapoint is a null value. Responsive to determining that the datapoint is not a null value, the cloud server application proceeds to step 715. Responsive to determining that the datapoint is a null value, at step 710 the cloud server application determines a replacement for the null value based upon a relationship between a first data column including the null value and at least one correlated data column (i.e., at least one data column correlated to the first data column) or based upon a relationship between interrelated values within the first data column. In an embodiment, in the event that the null value is in a first data column that is correlated with one or more other data columns, the cloud server application optionally replaces the null value with a value consistent with the data column correlation. According to such embodiment, the cloud server application optionally analyzes respective values within one or more other data columns (e.g., respective values in data columns adjacent to or otherwise associated with the first data column including the null value) in order to determine a correlation relationship between the first data column including the null value and other data column(s) and to replace the null value with a valid value identified based upon the correlation relationship. Additionally or alternatively, the cloud server application optionally analyzes respective values within one or more other data column rows (e.g., respective values in rows adjacent to or otherwise associated with the row of the null value) in order to determine a correlation relationship between the first data column including the null value and other data column(s) and to replace the null value with a valid value identified based upon the correlation relationship. The cloud server application optionally applies at least one pattern matching algorithm and/or at least one clustering algorithm to determine any such correlation relationship(s). In a further embodiment, in the event that the null value is in a data column having interrelated values based upon data column position (e.g., data column row), the cloud server application optionally replaces the null value with a value consistent with the data column position of the null value.

In an embodiment, the cloud server application determines the replacement for the null value according to step 710 based upon correlated value information and/or interrelated value information derived from the plurality of baseline data integration rules, based upon correlated value information and/or interrelated value information derived from adaptable rules and relational data obtained from repositories or ontologies, and/or based upon correlated value information and/or interrelated value information obtained by machine learning through application of the data standardization model. In a further embodiment, the cloud server application logs, marks, or otherwise records replacement of the null value as a standardization modification in the context of applying the model. According to such further embodiment, the cloud server application derives at least one rule of the proposed set of data standardization rules based upon the standardization modification. Any such proposed data standardization rule optionally supplements or otherwise modifies data column correlation rule(s) and/or interrelation rule(s) within the plurality of baseline data integration rules or within the plurality of data quality rules more generally in the context of the data standardization model. Upon execution of step 710, the cloud server application may proceed to the end of the method 700.

At step 715, the cloud server application determines whether the datapoint is a frequent outlier string value. The cloud server application identifies a frequent outlier string value as an outlier string value that has an occurrence rate of greater than or equal to a predetermined dataset frequency threshold. In the context of the various embodiments, the cloud server application optionally measures occurrence rate of an outlier string value based upon occurrence of such outlier string value within the dataset being processed according to the methods described herein, or alternatively the cloud server application measures the occurrence rate based upon occurrence of such outlier string value within a designated plurality of datasets which may or may not include the dataset being processed and/or within a sampled plurality of datasets. In the context of the various embodiments, a string value is a data type used to represent text. Such string value may include a sequence of letters, numbers, and/or symbols. In an embodiment, such string value may be or otherwise include a Variable Character Field (varchar), which in the context of the various embodiments is a character set of indeterminate length. A certain data class may be defined to include string values or otherwise may be associated with string values, e.g., as opposed to non-string values. For example, a postal code data class value may be defined to include string values of a certain quantity of characters (numbers and/or letters). Accordingly, in certain embodiments, a string value is distinguishable from a non-string value based upon data class type and/or data column type. Responsive to determining that the datapoint is not a frequent outlier string value, the cloud server application proceeds to step 725. Responsive to determining that the datapoint is a frequent outlier string value, at step 720 the cloud server application categorizes the frequent outlier string value as a valid value. In an embodiment, the cloud server application stores, tags, or otherwise marks the frequent outlier string value as a valid value in the context of the data standardization model. According to such embodiment, the cloud server application optionally stores the frequent outlier string value in the knowledge base associated with the model. In a further embodiment, the cloud server application logs, marks, or otherwise records validation of the frequent outlier string value as a standardization modification in the context of applying the model. According to such further embodiment, the cloud server application derives at least one rule of the proposed set of data standardization rules based upon the standardization modification. By validating the frequent outlier string value, the cloud server application facilitates automatic standardization with respect to the frequent outlier string value upon subsequent model application. Upon execution of step 720, the cloud server application may proceed to the end of the method 700.

At step 725, the cloud server application determines whether the datapoint is an infrequent outlier string value. The cloud server application identifies an infrequent outlier string value as an outlier string value that has an occurrence rate of less than the predetermined dataset frequency threshold. Responsive to determining that the datapoint is not an infrequent outlier string value, the cloud server application proceeds to step 735. Responsive to determining that the datapoint is an infrequent outlier string value, at step 730 the cloud server application applies a data crawling algorithm to evaluate the infrequent outlier string value via an automated application. In a related embodiment, inputs to the data crawling algorithm include the infrequent outlier string value and an associated data class name. In a further related embodiment, the data crawling algorithm is a web crawling algorithm designed to systematically access web pages. In the context of the various embodiments, the automated application may be or otherwise incorporate a bot. Additionally or alternatively, the cloud server application applies a data scraping algorithm in the context of step 730 to retrieve data in other sources beyond web pages. Upon execution of step 730, the cloud server application may proceed to the end of the method 700. A method with regard to applying the data crawling algorithm to evaluate the infrequent outlier string value according to step 730 is described with respect to FIG. 8.

At step 735, the cloud server application determines whether the datapoint is an outlier non-string value. In the context of the various embodiments, a non-string value represents data types incorporating one or more aspects beyond text, such as a regular expression. A regular expression includes a sequence of characters defining a search pattern. Whereas string values are generally defined through a finite listing of values, non-string values are evaluated based upon pattern analysis, e.g., regular expression analysis. In certain embodiments, a non-string value is distinguishable from a string value based upon data class type and/or data column type. A certain data class may be defined to include non-string values or otherwise may be associated with non-string values, e.g., as opposed to string values.

In an embodiment, the cloud server application determines that a non-string value is an outlier value, and more specifically determines one or more anomalies based upon which the non-string value is an outlier value, consequent to regular expression analysis, i.e., search pattern analysis. The cloud server application identifies the one or more anomalies as format violation(s) during regular expression analysis. For instance, the cloud server application may determine that a non-string social security number data class value is an outlier value based upon missing hyphens, since a defined pattern of hyphens is required for regular expression validation of a non-string value in a social security number data class. In another example, the cloud server application may determine that a non-string email address data class value is an outlier value based upon a missing period, since a period within a domain name is required for regular expression validation of a non-string value in an email address data class. According to such embodiment, the cloud server application identifies format violation(s) associated with an outlier non-string value at least in part based upon application of the plurality of baseline data integration rules included within the plurality of data quality rules. Responsive to application of the plurality of baseline data integration rules, alert(s) associated with non-string value format violation(s) optionally are triggered automatically. In a further embodiment, the cloud server application determines that the datapoint is an outlier non-string value based upon one or more anomalies in one or more string portions within such datapoint. In a further embodiment, the cloud server application determines that the datapoint is an outlier non-string value based upon the datapoint being a duplicate value within a data column associated with unique values. For instance, the cloud server application may identify as a non-string outlier value a datapoint having a non-string social security number data class value that is a duplicate value of at least one other datapoint within a social security number data column.

Responsive to determining that the datapoint is an outlier non-string value, at step 740 the cloud server application determines a remediation for the outlier non-string value. Upon execution of step 740, the cloud server application may proceed to the end of the method 700. Multiple methods with regard to determining a remediation for the outlier non-string value according to step 740 are described with respect to FIGS. 9-11. Responsive to determining that the datapoint is not an outlier non-string value, optionally at step 745 the cloud server application investigates identity of the datapoint via crowdsourcing and/or external repository consultation and then may proceed to the end of the method 700. In an embodiment, the cloud server application facilitates crowdsourcing by consulting a public forum of data experts or subject matter experts. Failure to identify the datapoint prior to step 745 may be indicative of a data quality exception, e.g., caused by a poorly defined value. According to one or more alternative embodiments, the cloud server application executes the steps of the method 700 in alternative configurations. For instance, the cloud server application may execute steps 705-710, steps 715-720, steps 725-730, and steps 735-740 in one or more alternate sequences.

In sum, determining at least one standardization modification to remediate the datapoint according to the method 700 includes, responsive to determining that the datapoint is a null value, determining a replacement for the null value based upon a relationship between a first data column including the null value and at least one correlated data column or based upon a relationship between interrelated values within the first data column. Furthermore, determining at least one standardization modification to remediate the datapoint according to the method 700 includes, responsive to determining that the datapoint is a frequent outlier string value having an occurrence rate of greater than or equal to a predetermined dataset frequency threshold, categorizing the frequent outlier string value as a valid value. Moreover, determining at least one standardization modification to remediate the datapoint according to the method 700 includes, responsive to determining that the datapoint is an infrequent outlier string value having an occurrence rate of less than the predetermined dataset frequency threshold, applying a data crawling algorithm to evaluate the infrequent outlier string value via an automated application, wherein inputs to the data crawling algorithm include the infrequent outlier string value and an associated data class name. Additionally, determining at least one standardization modification to remediate the datapoint according to the method 700 includes, responsive to determining that the datapoint is an outlier non-string value, determining a remediation for the outlier non-string value.

Figure 8:
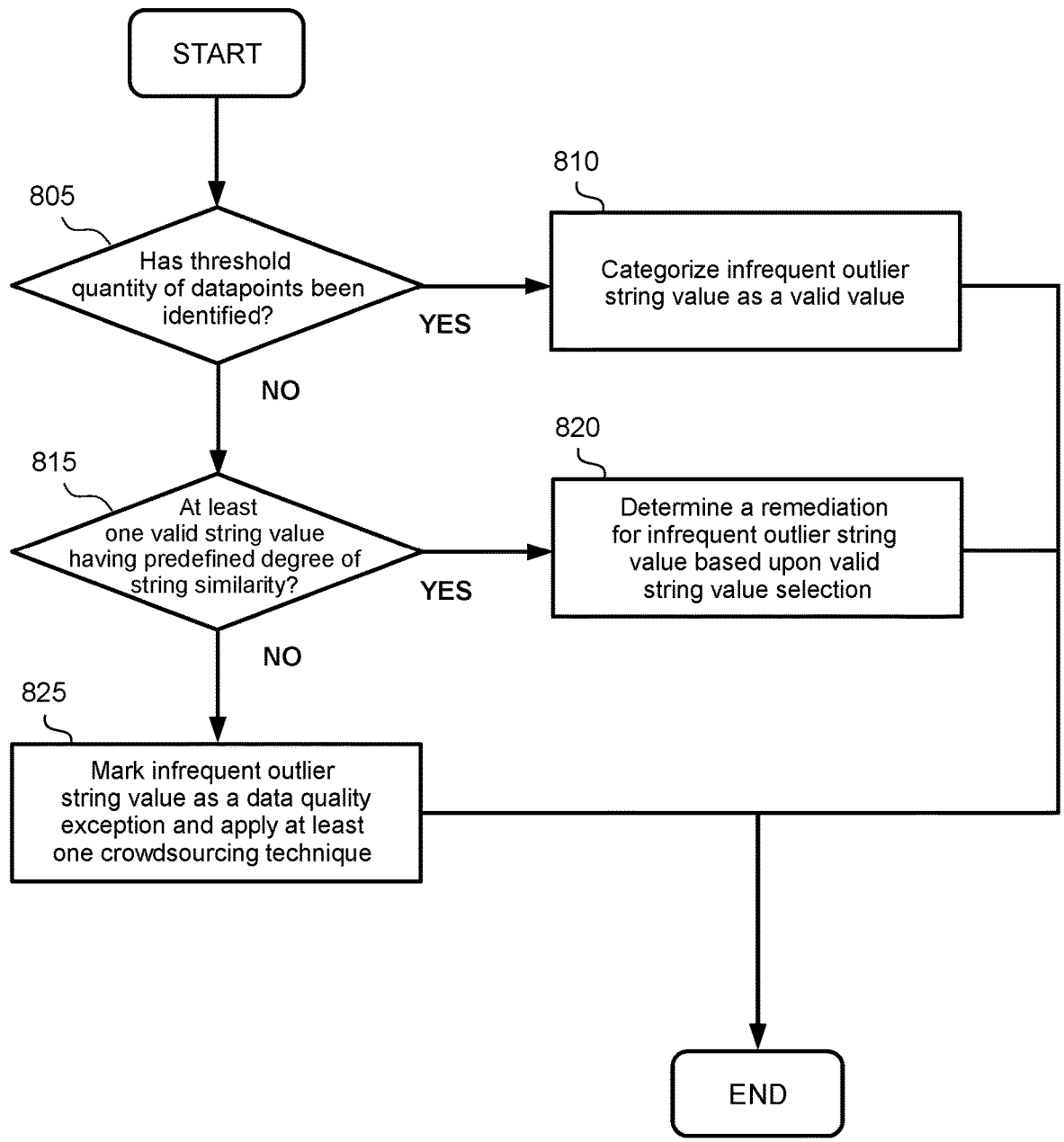
FIG. 8 illustrates a method of applying a data crawling algorithm to evaluate an infrequent outlier string value within a dataset, according to one or more embodiments.

FIG. 8 illustrates a method 800 of applying the data crawling algorithm to evaluate the infrequent outlier string value, in the context of step 730 of the method 700. The method 800 begins at step 805, where the cloud server application determines whether a threshold quantity of datapoints associated with both the infrequent outlier string value and the associated data class name has been identified via data crawling. Responsive to failure to identify a threshold quantity of datapoints associated with both the infrequent outlier string value and the associated data class name, the cloud server application proceeds to step 815. Responsive to identifying a threshold quantity of datapoints associated with both the infrequent outlier string value and the associated data class name, at step 810 the cloud server application categorizes the infrequent outlier string value as a valid value. In an embodiment, the cloud server application stores, tags, or otherwise marks the infrequent outlier string value as a valid value in the context of the data standardization model. According to such embodiment, the cloud server application optionally stores the infrequent outlier string value as a valid value in the knowledge base associated with the model. In a further embodiment, the cloud server application logs, marks, or otherwise records validation of the infrequent outlier string value as a standardization modification in the context of applying the model. According to such further embodiment, the cloud server application derives at least one rule of the proposed set of data standardization rules based upon the standardization modification. By validating the infrequent outlier string value, the cloud server application facilitates automatic standardization with respect to the infrequent outlier string value upon subsequent model application. Upon execution of step 810, the cloud server application may proceed to the end of the method 800.

At step 815, the cloud server application determines whether there is at least one valid string value within the dataset having a predefined degree of string similarity to the infrequent outlier string value. In an embodiment, the cloud server application defines the predetermined degree of string similarity between the infrequent outlier string value and a valid string value based upon the infrequent outlier string value and the valid string value having a maximum quantity of character differences. Additionally or alternatively, the cloud server application defines the predetermined degree of string similarity between the infrequent outlier string value and a valid string value based upon the infrequent outlier string value and the valid string value having a minimum quantity of common characters. Additionally or alternatively, the cloud server application defines the predetermined degree of string similarity between the infrequent outlier string value and a valid string value based upon the infrequent outlier string value and the valid string value having respective string lengths that differ by less than a predetermined threshold. Responsive to failure to identify at least one valid string value within the dataset having the predefined degree of string similarity to the infrequent outlier string value, the cloud server application proceeds to step 825. Responsive to identifying at least one valid string value within the dataset having the predefined degree of string similarity to the infrequent outlier string value, at step 820 the cloud server application determines a remediation for the infrequent outlier string value based upon valid string value selection. In an embodiment, valid string value selection includes selecting a valid string value among the at least one valid string value and determining at least one modification to the infrequent outlier string value based upon any identified character difference between the infrequent outlier string value and the selected valid string value. In a further embodiment, the cloud server application logs, marks, or otherwise records the at least one modification of the infrequent outlier string value as a standardization modification in the context of applying the model. According to such embodiment, the cloud server application derives at least one rule of the proposed set of data standardization rules based upon the standardization modification.

Selecting a valid string value among the at least one valid string value according to step 820 optionally includes assessing quantitative similarity between the infrequent outlier string value and each of the at least one valid string value. In an embodiment, the cloud server application assesses quantitative similarity by calculating a quantitative similarity score for each of the at least one valid string value based upon assessed similarity between the valid string value and the infrequent outlier string value. According to such embodiment, the cloud server application selects a valid string value among the at least one valid string value based upon highest calculated quantitative similarity score. The cloud server application optionally calculates the quantitative similarity score based upon one or more similarity assessment factors. A similarity assessment factor optionally includes edit distance between the infrequent outlier string value and each of the at least one valid string value. In the context of the various embodiments, edit distance is a quantity of modifications required to modify an outlier value to conform with a certain valid value. Additionally or alternatively, a similarity assessment factor includes data source of the infrequent outlier string value compared with each of the at least one valid string value. Data source in such context optionally includes originating location and/or identity of author(s). Additionally or alternatively, a similarity assessment factor includes data classification of the infrequent outlier string value compared with each of the at least one valid string value. Data classification in such context optionally includes data class, data type, subject matter, intended demographic(s), data age, data modification history, and/or values of associated data fields.

In a related embodiment, the one or more similarity assessment factors are weighted such that a similarity assessment factor with a relatively higher weight has a greater influence on the calculated quantitative similarity score than a similarity assessment factor with a relatively lower weight. In order to distinguish between two valid values having a same quantitative similarity score (e.g., two municipality values from a common source and within a same data class having a single character difference), the cloud server application optionally selects one of the two valid values based upon evaluation of respective associated field values in a related data class for each of the two valid values (e.g., postal code data class values for each of the two municipality data class values). The cloud server application may select one of the two valid values based upon which of the two valid values has an associated field value that meets or more completely adheres to one or more conditions established for an associated data class and/or for an associated data column as determined by the data standardization rule sets associated with the data standardization model, e.g., previously accepted data standardization rule sets. For instance, given infrequent outlier string municipality data class value "Middletonw" and valid municipality data class values "Middleton" and "Middletown", the cloud server application may select one of the two valid municipality data class values based upon which valid value has a postal code that meets or more completely adheres to one or more conditions established for an associated postal code data class and/or for an associated postal code data column as determined by data standardization rule sets associated with the model.

In a further related embodiment, the cloud server application assesses quantitative similarity between the infrequent outlier string value and each of the at least one valid string value by applying an algorithm based upon a weighted decision tree. The cloud server application optionally determines respective weight values of the weighted decision tree based upon respective edit distances between the infrequent outlier string value and each of the at least one valid string value. Additionally or alternatively, the cloud server application optionally determines respective weight values of the weighted decision tree based upon respective values in data columns related to (e.g., correlated with or otherwise associated with) the data column of the infrequent outlier string value.

Additionally or alternatively, selecting a valid string value among the at least one valid string value according to step 820 optionally includes applying one or more heuristics based at least in part upon string value selection history. In the context of this embodiment and other embodiments described herein, a heuristic is a machine logic based rule that provides a determination based upon one or more predetermined types of input. A predetermined type of input to one or more heuristics in the context of selecting a valid string value among the at least one valid string value may include valid string selection history, e.g., a most recently selected valid string or a most frequently selected valid string, in the context of a data class and/or a data column associated with the infrequent outlier string value. Upon execution of step 820, the cloud server application may proceed to the end of the method 800.

At step 825, the cloud server application marks the infrequent outlier string value as a data quality exception and applies at least one crowdsourcing technique to determine a remediation for the infrequent outlier string value. In an embodiment, the cloud server application facilitates crowdsourcing by consulting a public forum of data experts or subject matter experts for one or more rectification techniques to identify a valid string value based upon which to effect a remediation. In a further embodiment, the cloud server application logs, marks, or otherwise records the remediation of the infrequent outlier string value as a standardization modification in the context of applying the model. According to such embodiment, the cloud server application derives at least one rule of the proposed set of data standardization rules based upon the standardization modification. If crowdsourcing fails to identify a valid string value, the cloud server application optionally replaces the infrequent outlier string value with a null value. Upon execution of step 825, the cloud server application may proceed to the end of the method 800.

In sum, applying the data crawling algorithm to evaluate the infrequent outlier string value according to the method 800 includes, responsive to identifying a threshold quantity of datapoints associated with both the infrequent outlier string value and the associated data class name, categorizing the infrequent outlier string value as a valid value. Additionally, applying the data crawling algorithm to evaluate the infrequent outlier string value according to the method 800 includes, responsive to failure to identify a threshold quantity of datapoints associated with both the infrequent outlier string value and the associated data class name, determining whether there is at least one valid string value within the dataset having a predefined degree of string similarity to the infrequent outlier string value. In such case, applying the data crawling algorithm to evaluate the infrequent outlier string value according to the method 800 further includes, responsive to identifying at least one valid string value within the dataset having the predefined degree of string similarity, determining a remediation for the infrequent outlier string value by selecting a valid string value among the at least one valid string value and determining at least one modification to the infrequent outlier string value based upon any identified character difference between the infrequent outlier string value and the selected valid string value. In a related embodiment, selecting a valid string value among the at least one valid string value includes assessing quantitative similarity between the infrequent outlier string value and each of the at least one valid string value. In a further related embodiment, selecting a valid string value among the at least one valid string value includes applying one or more heuristics based at least in part upon string value selection history. Moreover, applying the data crawling algorithm to evaluate the infrequent outlier string value according to the method 800 further includes, responsive to failure to identify at least one valid string value within the dataset having the predefined degree of string similarity, applying at least one crowdsourcing technique to determine a remediation for the infrequent outlier string value.

Figure 9:
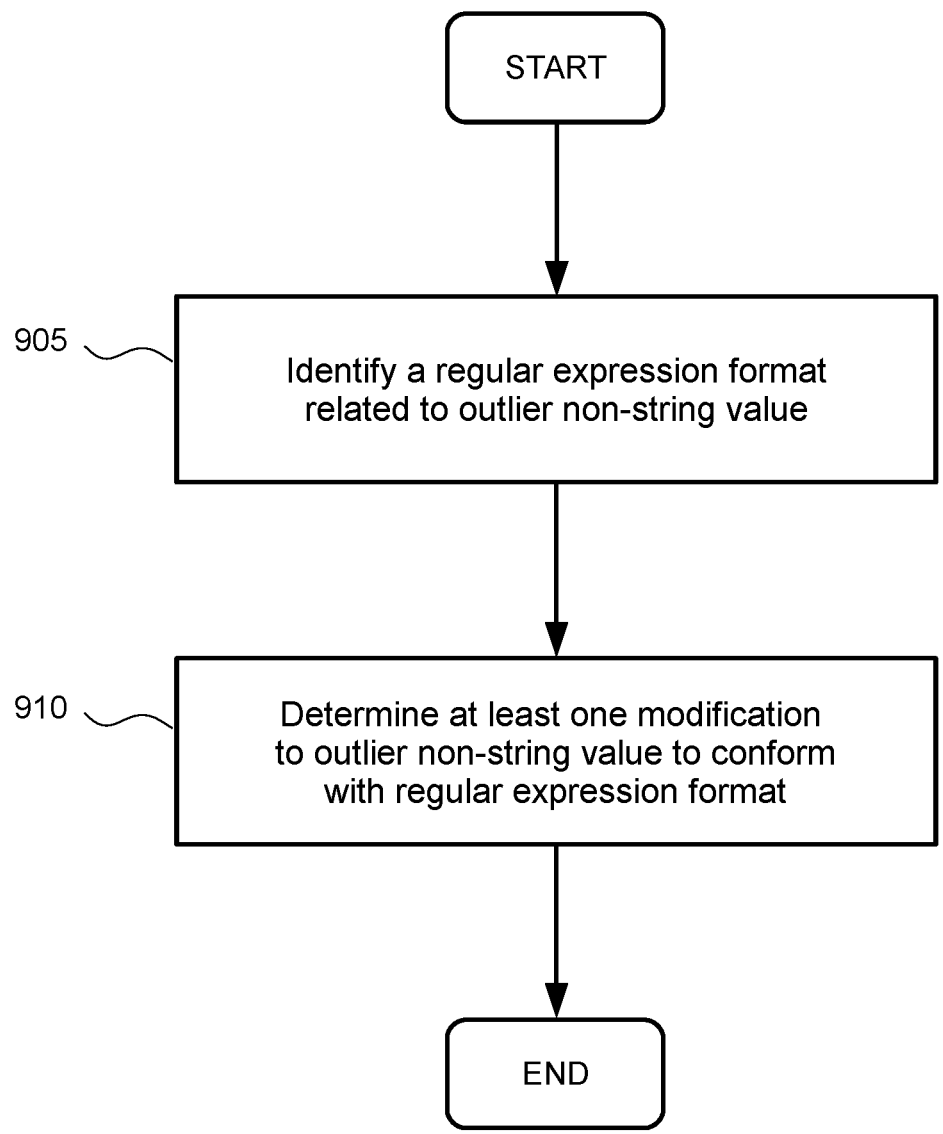
FIG. 9 illustrates a method of determining a remediation for an outlier non-string value within a dataset, according to one or more embodiments.

FIG. 9 illustrates a method 900 of determining a remediation for the outlier non-string value, in the context of step 740 of the method 700. The method 900 begins at step 905, where the cloud server application identifies a regular expression format related to the outlier non-string value. In an embodiment, the cloud server application identifies regular expression format and/or any predefined regular expression rules based upon a data class assigned to the outlier non-string value. Additionally or alternatively, the cloud server application identifies regular expression format and/or any predefined regular expression rules based upon one or more character, syntax, and/or symbol patterns identified within the outlier non-string value. At step 910, the cloud server application determines at least one modification to the outlier non-string value to conform with the regular expression format. In an embodiment, the at least one modification includes correction of any character, syntax, and/or symbol discrepancy as dictated by the regular expression format. In the context of the various embodiments, syntax discrepancies in an outlier non-string value with respect to regular expression format may include nonconforming placement of characters (letters and/or numbers) relative to symbols, nonconforming character order, nonconforming punctuation, and/or a nonconforming pattern. For instance, an outlier non-string value of a date data class may have a nonconforming pattern in terms of month, date, and/or year representation. Symbol discrepancies in an outlier non-string value with respect to regular expression format may include symbol omission and/or nonconforming symbol use, e.g., use of a symbol in the outlier non-string value that is analogous but not identical to a corresponding symbol in the valid non-string value. For instance, an outlier non-string value may use slashes between the aspects of a date, while a relevant regular expression format for a date data class value may require use of hyphens rather than slashes. While the outlier non-string value in such instance may represent a date, nonetheless the value may violate the relevant regular expression format required per the data standardization model, and thus the cloud server application may modify the value in accordance with step 910 to conform to such format. In a further embodiment, the cloud server application logs, marks, or otherwise records the at least one modification of the outlier non-string value as a standardization modification in the context of applying the model. According to such further embodiment, the cloud server application derives at least one rule of the proposed set of data standardization rules based upon the standardization modification.

In sum, determining a remediation for the outlier non-string value according to the method 900 includes identifying a regular expression format related to the outlier non-string value and determining at least one modification to the outlier non-string value to conform with the regular expression format.

Figure 10:
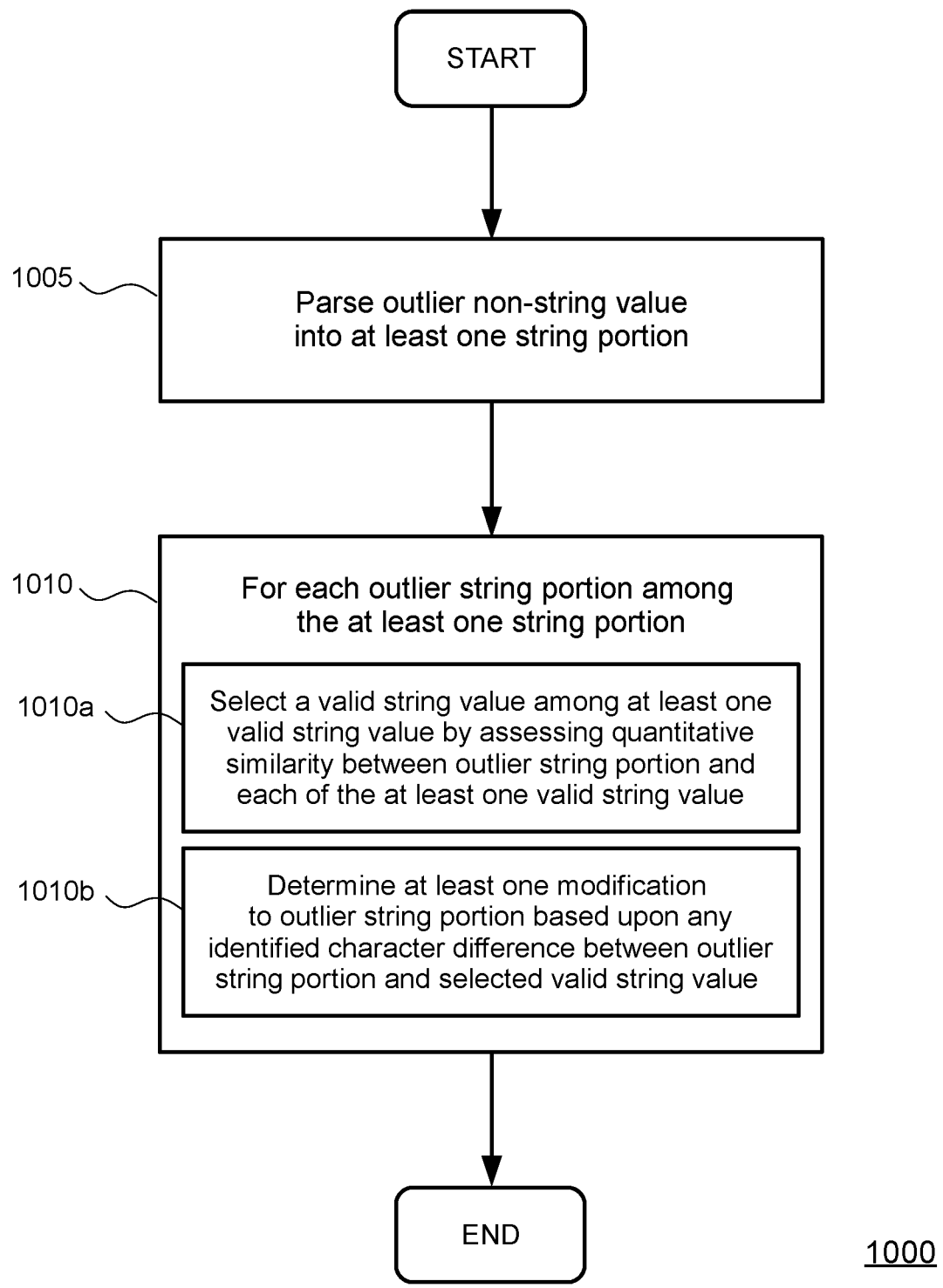
FIG. 10 illustrates a method of determining a remediation for an outlier non-string value within a dataset, according to one or more further embodiments.

FIG. 10 illustrates a method 1000 of determining a remediation for the outlier non-string value, in the context of step 740 of the method 700. The cloud server application optionally executes steps of the method 1000 in addition to or as an alternative to steps of the method 900. The method 1000 begins at step 1005, where the cloud server application parses the outlier non-string value into at least one string portion. The cloud server application parses the outlier non-string value to identify any string portion within the non-string value and then analyzes each identified string portion to determine any format violation therein. Upon determining any format violation within any such string portion, the cloud server application marks the string portion as an outlier string portion. At step 1010, for each outlier string portion among the at least one string portion, i.e., for each string portion including at least one anomaly, the cloud server application executes two substeps. At substep 1010*a*, the cloud server application selects a valid string value among at least one valid string value by assessing quantitative similarity between the outlier string portion and each of the at least one valid string value. In an embodiment, to assess quantitative similarity, the cloud server application applies at least one technique analogous to the techniques previously described with respect to step 820, e.g., calculation of a quantitative similarity score or application of an algorithm based upon a weighted decision tree. At substep 1010*b*, the cloud server application determines at least one modification to the outlier string portion based upon any identified character difference between the outlier string portion and the valid string value selected at substep 1010*a*. In an embodiment, the cloud server application logs, marks, or otherwise records the at least one modification of the outlier string portion as a standardization modification in the context of applying the model. According to such further embodiment, the cloud server application derives at least one rule of the proposed set of data standardization rules based upon the standardization modification.

In sum, determining a remediation for the outlier non-string value according to the method 1000 includes parsing the outlier non-string value into at least one string portion and, for each outlier string portion among the at least one string portion, selecting a valid string value among the at least one valid string value by assessing quantitative similarity between the outlier string portion and each of the at least one valid string value and further by determining at least one modification to the outlier string portion based upon any identified character difference between the outlier string portion and the selected valid string value.

Figure 11:
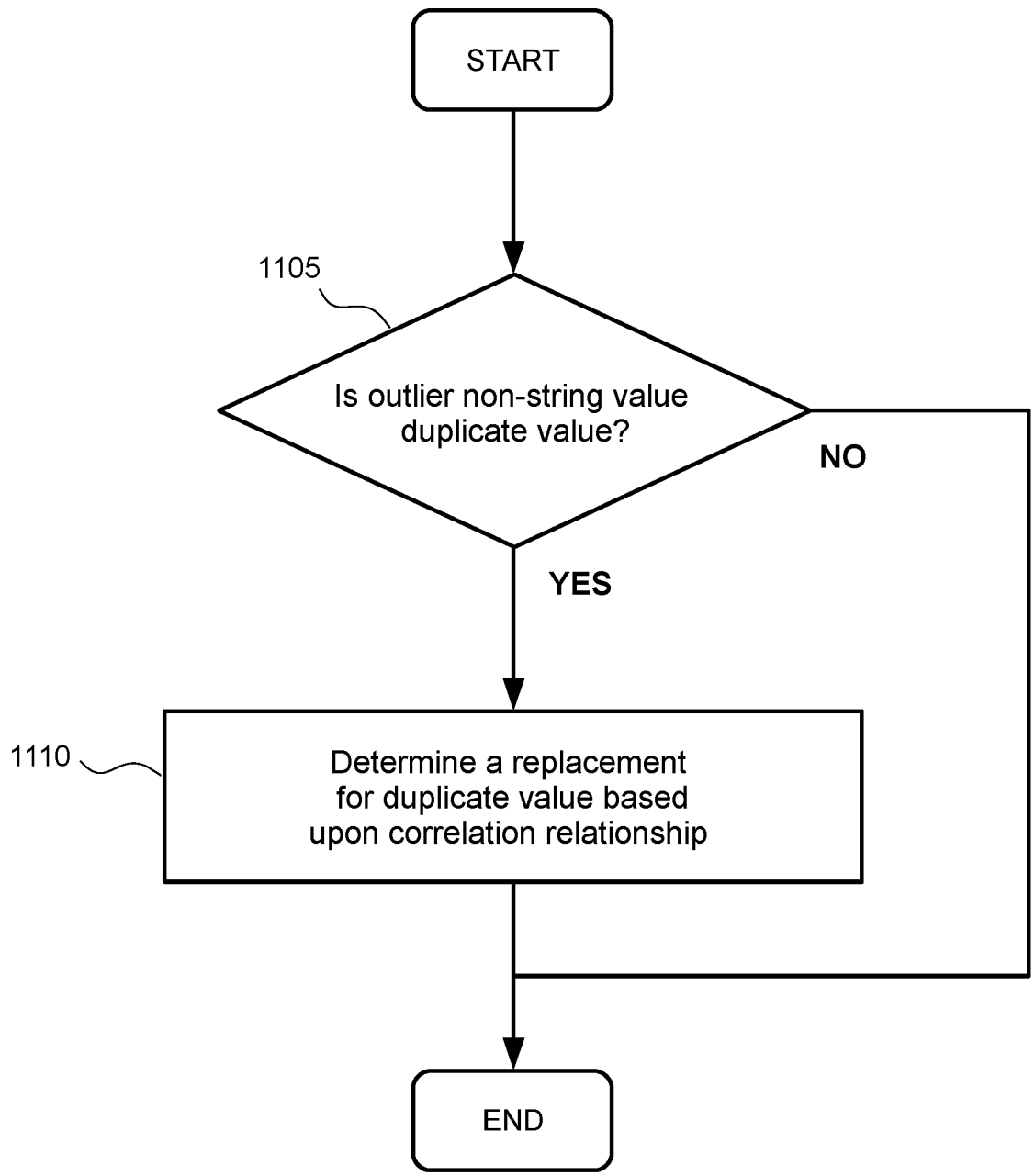
FIG. 11 illustrates a method of determining a remediation for an outlier non-string value within a dataset, according to one or more further embodiments.

FIG. 11 illustrates a method 1100 of determining a remediation for the outlier non-string value, in the context of step 740 of the method 700. The cloud server application optionally executes steps of the method 1100 in addition to or as an alternative to steps of the methods 900 and/or 1000. The method 1100 begins at step 1105, where the cloud server application determines whether the outlier non-string value is a duplicate value. Responsive to determining that the outlier non-string value is not a duplicate value, the cloud server application may proceed to the end of the method 1100. Responsive to determining that the outlier non-string value is a duplicate value, at step 1110 the cloud server application determines a replacement for the duplicate value based upon a relationship between a first data column including the duplicate value and at least one correlated data column, i.e., at least one data column correlated to the first data column. In an embodiment, in the event that the duplicate value is in a first data column that is correlated with one or more other data columns, the cloud server application optionally replaces the duplicate value with a value consistent with the data column correlation. According to such embodiment, the cloud server application optionally analyzes respective values within one or more other data columns (e.g., respective values in data columns adjacent to or otherwise associated with the first data column including the duplicate value) in order to determine a correlation relationship between the first data column including the duplicate value and other data column(s) and to replace the duplicate value with a valid value identified based upon the correlation relationship. For instance, upon determining a duplicate social security number data class value within a social security number data column, the cloud server application may analyze one or more name data class values in a correlated data column to determine a proper social security number data class value replacement based upon the one or more name data class values. Additionally or alternatively, the cloud server application optionally analyzes respective values within one or more other data column rows (e.g., respective values in rows adjacent to or otherwise associated with the row of the duplicate value) in order to determine a correlation relationship between the first data column including the duplicate value and other data column(s) and to replace the duplicate value with a valid value identified based upon the correlation relationship. The cloud server application optionally applies at least one pattern matching algorithm and/or at least one clustering algorithm to determine any such correlation relationship(s). In a further embodiment, the cloud server application logs, marks, or otherwise records replacement of the duplicate value as a standardization modification in the context of applying the model. According to such further embodiment, the cloud server application derives at least one rule of the proposed set of data standardization rules based upon the standardization modification. Any such proposed data standardization rule optionally supplements or otherwise modifies data column correlation rule(s) within the plurality of baseline data integration rules or within the plurality of data quality rules more generally in the context of the data standardization model.

In sum, determining a remediation for the outlier non-string value according to the method 1100 includes, responsive to determining that the outlier non-string value is a duplicate value, determining a replacement for the duplicate value based upon a relationship between a first data column including the duplicate value and at least one correlated data column.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a dataset during a data onboarding procedure;
   classifying datapoints within the dataset;
   applying a machine learning data standardization model to each classified datapoint within the dataset; and
   deriving a proposed set of data standardization rules for the dataset based upon any standardization modification determined consequent to outlier value application of the machine learning data standardization model.

2. The computer-implemented method of claim 1, further comprising:
   presenting the proposed set of data standardization rules for client review; and
   responsive to acceptance of the proposed set of data standardization rules, applying the proposed set of data standardization rules to the dataset.

3. The computer-implemented method of claim 1, further comprising:
   responsive to acceptance of the proposed set of data standardization rules, updating the machine learning data standardization model based upon the proposed set of data standardization rules.

4. The computer-implemented method of claim 1, wherein configuring the machine learning data standardization model comprises:
   sampling a plurality of datasets during a plurality of respective data onboarding scenarios;
   identifying respective data anomaly scenarios based upon the plurality of sampled datasets;
   identifying existing data anomaly rectification techniques to address the respective data anomaly scenarios; and
   training the machine learning data standardization model based upon applicability of the existing data anomaly rectification techniques to the respective data anomaly scenarios.

5. The computer-implemented method of claim 1, wherein applying the machine learning data standardization model to each classified datapoint within the dataset comprises:
   responsive to determining that the datapoint is an outlier value addressed by a preexisting standardization rule incorporated into the machine learning data standardization model, dynamically modifying the outlier value by applying the preexisting standardization rule.

6. The computer-implemented method of claim 1, wherein applying the machine learning data standardization model to each classified datapoint within the dataset comprises:
   responsive to determining that the datapoint is an outlier value unaddressed by any preexisting standardization rule, determining at least one standardization modification to remediate the datapoint.

7. The computer-implemented method of claim 6, wherein determining at least one standardization modification to remediate the datapoint comprises:
   responsive to determining that the datapoint is a null value, determining a replacement for the null value based upon a relationship between a first data column including the null value and at least one correlated data column or based upon a relationship between interrelated values within the first data column.

8. The computer-implemented method of claim 6, wherein determining at least one standardization modification to remediate the datapoint comprises:
   responsive to determining that the datapoint is a frequent outlier string value having an occurrence rate of greater than or equal to a predetermined dataset frequency threshold, categorizing the frequent outlier string value as a valid value.

9. The computer-implemented method of claim 6, wherein determining at least one standardization modification to remediate the datapoint comprises:
   responsive to determining that the datapoint is an infrequent outlier string value having an occurrence rate of less than a predetermined dataset frequency threshold, applying a data crawling algorithm to evaluate the infrequent outlier string value via an automated application, wherein inputs to the data crawling algorithm include the infrequent outlier string value and an associated data class name.

10. The computer-implemented method of claim 9, wherein applying the data crawling algorithm to evaluate the infrequent outlier string value comprises:
    responsive to identifying a threshold quantity of datapoints associated with both the infrequent outlier string value and the associated data class name, categorizing the infrequent outlier string value as a valid value.

11. The computer-implemented method of claim 9, wherein applying the data crawling algorithm to evaluate the infrequent outlier string value comprises:
    responsive to failure to identify a threshold quantity of datapoints associated with both the infrequent outlier string value and the associated data class name, determining whether there is at least one valid string value within the dataset having a predefined degree of string similarity to the infrequent outlier string value; and responsive to identifying at least one valid string value within the dataset having the predefined degree of string similarity, determining a remediation for the infrequent outlier string value by selecting a valid string value among the at least one valid string value and determining at least one modification to the infrequent outlier string value based upon any identified character difference between the infrequent outlier string value and the selected valid string value.

12. The computer-implemented method of claim 11, wherein selecting a valid string value among the at least one valid string value comprises assessing quantitative similarity between the infrequent outlier string value and each of the at least one valid string value.

13. The computer-implemented method of claim 11, wherein selecting a valid string value among the at least one valid string value comprises applying one or more heuristics based at least in part upon string value selection history.

14. The computer-implemented method of claim 11, wherein applying the data crawling algorithm to evaluate the infrequent outlier string value further comprises:

responsive to failure to identify at least one valid string value within the dataset having the predefined degree of string similarity, applying at least one crowdsourcing technique to determine a remediation for the infrequent outlier string value.

15. The computer-implemented method of claim 6, wherein determining at least one standardization modification to remediate the datapoint comprises:

responsive to determining that the datapoint is an outlier non-string value, determining a remediation for the outlier non-string value.

16. The computer-implemented method of claim 15, wherein determining a remediation for the outlier non-string value comprises:

identifying a regular expression format related to the outlier non-string value; and determining at least one modification to the outlier non-string value to conform with the regular expression format.

17. The computer-implemented method of claim 15, wherein determining a remediation for the outlier non-string value comprises:

parsing the outlier non-string value into at least one string portion; and for each outlier string portion among the at least one string portion:

selecting a valid string value among at least one valid string value by assessing quantitative similarity between the outlier string portion and each of the at least one valid string value; and determining at least one modification to the outlier string portion based upon any identified character difference between the outlier string portion and the selected valid string value.

18. The computer-implemented method of claim 15, wherein determining a remediation for the outlier non-string value comprises:

responsive to determining that the outlier non-string value is a duplicate value, determining a replacement for the duplicate value based upon a relationship between a first data column including the duplicate value and at least one correlated data column.

19. A computer program product comprising a computer readable storage medium having program instructions embodied therewith, the program instructions executable by a computing device to cause the computing device to:

receive a dataset during a data onboarding procedure;

classify datapoints within the dataset;

apply a machine learning data standardization model to each classified datapoint within the dataset; and derive a proposed set of data standardization rules for the dataset based upon any standardization modification determined consequent to outlier value application of the machine learning data standardization model.

20. A system comprising:

at least one processor; and a memory storing an application program, which, when executed on the at least one processor, performs an operation comprising:

receiving a dataset during a data onboarding procedure;

classifying datapoints within the dataset;

applying a machine learning data standardization model to each classified datapoint within the dataset; and deriving a proposed set of data standardization rules for the dataset based upon any standardization modification determined consequent to outlier value application of the machine learning data standardization model.

* * * * *